(12) United States Patent
Pihet

(10) Patent No.: US 9,965,426 B2
(45) Date of Patent: May 8, 2018

(54) SYSTEM AND METHOD FOR A LOW EMISSION NETWORK

(71) Applicant: Infineon Technologies AG, Neubiberg (DE)

(72) Inventor: Eric Pihet, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 474 days.

(21) Appl. No.: 14/591,745

(22) Filed: Jan. 7, 2015

(65) Prior Publication Data

US 2016/0196230 A1 Jul. 7, 2016

(51) Int. Cl.
*H04B 3/00* (2006.01)
*G06F 13/40* (2006.01)
*G06F 13/42* (2006.01)
*G05F 1/625* (2006.01)

(52) U.S. Cl.
CPC .......... *G06F 13/4027* (2013.01); *G05F 1/625* (2013.01); *G06F 13/4221* (2013.01)

(58) Field of Classification Search
CPC . H04L 2012/40215; H04L 2012/40273; H04L 12/40013; H04L 25/0272; H04L 12/40039; H04L 25/085; H04L 49/30; H04L 12/40; H04L 12/40032; H04L 12/40169; H04L 25/0264; G06F 13/4282; G06F 13/4221; G06F 13/40; G06F 13/42; G06F 13/4027; H03F 3/45076; H03F 3/45704; G05F 1/625

USPC ........ 326/82, 86, 33; 375/257; 710/106, 314
See application file for complete search history.

(56) References Cited

U.S. PATENT DOCUMENTS

| | | | |
|---|---|---|---|
| 5,592,510 A * | 1/1997 | Van Brunt | H03F 3/45179 326/86 |
| 6,154,061 A | 11/2000 | Boezen et al. | |
| 6,864,704 B1 * | 3/2005 | Wong | H03K 19/01856 326/26 |
| 6,922,073 B2 | 7/2005 | Haase et al. | |
| 7,183,793 B2 * | 2/2007 | Jordanger | H03K 19/00346 326/26 |
| 7,888,969 B2 | 2/2011 | Metzner et al. | |
| 2006/0160511 A1 * | 7/2006 | Trichy | G06F 13/4072 455/255 |
| 2007/0217548 A1 * | 9/2007 | Berckmans | H04L 12/40013 375/317 |
| 2014/0091833 A1 | 4/2014 | Astrom et al. | |
| 2014/0330996 A1 * | 11/2014 | de Haas | G06F 13/4031 710/106 |

FOREIGN PATENT DOCUMENTS

| CN | 103023584 A | 4/2013 |
|---|---|---|
| CN | 104012058 A | 8/2014 |

* cited by examiner

*Primary Examiner* — Rahel Guarino
(74) *Attorney, Agent, or Firm* — Slater Matsil, LLP

(57) ABSTRACT

According to various embodiments, a method of operating a two-wire digital bus includes applying a bias voltage to the two-wire digital bus at a first interface node, measuring a common mode voltage of the two-wire digital bus at the first interface node, and adjusting the bias voltage at the first interface node based on the measured common mode voltage.

27 Claims, 16 Drawing Sheets

SYSTEM AND METHOD FOR A LOW EMISSION NETWORK

TECHNICAL FIELD

The present invention relates generally to electronic circuits and communications, and, in particular embodiments, to a system and method for a low emission network.

BACKGROUND

In numerous applications, especially in the automotive industry, a controller area network (CAN) bus is used to allow microcontrollers and devices to communicate with each other within a vehicle or system without using a host computer. A CAN bus uses a message-based protocol designed specifically for automotive applications; however, the CAN bus protocol is now also used in areas such as aerospace, maritime, industrial automation, and medical equipment.

Development of the CAN bus protocol started at Robert Bosch GmbH. The protocol was officially released at the Society of Automotive Engineers (SAE) congress in Detroit, Mich. and the first CAN controller chips were produced by Intel and Philips. Bosch has since continued to extend the CAN standards. For example, Bosch released CAN FD 1.0, which describes a CAN protocol with a flexible data rate. The CAN FD specification uses a different format that allows different data lengths and variable bit rates during data transmission.

The CAN bus protocol is one of five protocols used in the on-board diagnostics (OBD)-II vehicle diagnostics standard. The OBD-II standard is important in the automotive industry and has been mandatory for all cars and light trucks sold in the United States since 1996.

As a further example, a modern automobile may have as many as 70 electronic control units (ECU) for various subsystems. Typically, the biggest processor is the engine control unit, and others are used for the transmission, airbag system, antilock braking system (ABS), cruise control, electric power steering, audio systems, power windows, doors, mirror adjustment system, battery system, or recharging systems for hybrid/electric cars, for example. Depending on the system, some may operate independently or nearly independently while other systems may require substantial communication with various additional systems in order to operate properly. The CAN bus protocol allows these disparate systems to interact safely, simply, and efficiently.

The CAN bus protocol includes a multi-master serial bus standard for connecting ECUs, referred to as nodes, to one another. Two or more nodes are connected on a CAN bus and communicate with each other over the bus. In different examples, the complexity of a node can range from a simple I/O device up to an embedded computer with a CAN interface and sophisticated software. Some nodes may also act as a gateway allowing a standard computer to communicate over a USB or Ethernet port to the devices on a CAN network.

According to the CAN bus protocol, each node is able to send and receive messages. A message, which may be referred to as a frame or telegram, consists primarily of an ID (identifier), which represents the priority of the message, and up to eight data bytes. The improved CAN FD extends the length of the data section to up to 64 bytes per message or frame. The frames are transmitted serially onto the bus encoded in a non-return-to-zero (NRZ) format, and each frame may be received by all nodes.

Generally, devices connected by a CAN bus are sensors, actuators, and other control devices. These devices are not connected directly to the bus, but through a CAN controller. In various applications, electromagnetic frequency (EMF) emissions may be produced by a CAN bus, and these emissions may cause detrimental effects in some circumstances. Innovations in CAN bus transceivers and associated circuits may improve operations of a CAN bus in various circumstances.

SUMMARY

According to various embodiments, a method of operating a two-wire digital bus includes applying a bias voltage to the two-wire digital bus at a first interface node, measuring a common mode voltage of the two-wire digital bus at the first interface node, and adjusting the bias voltage at the first interface node based on the measured common mode voltage.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
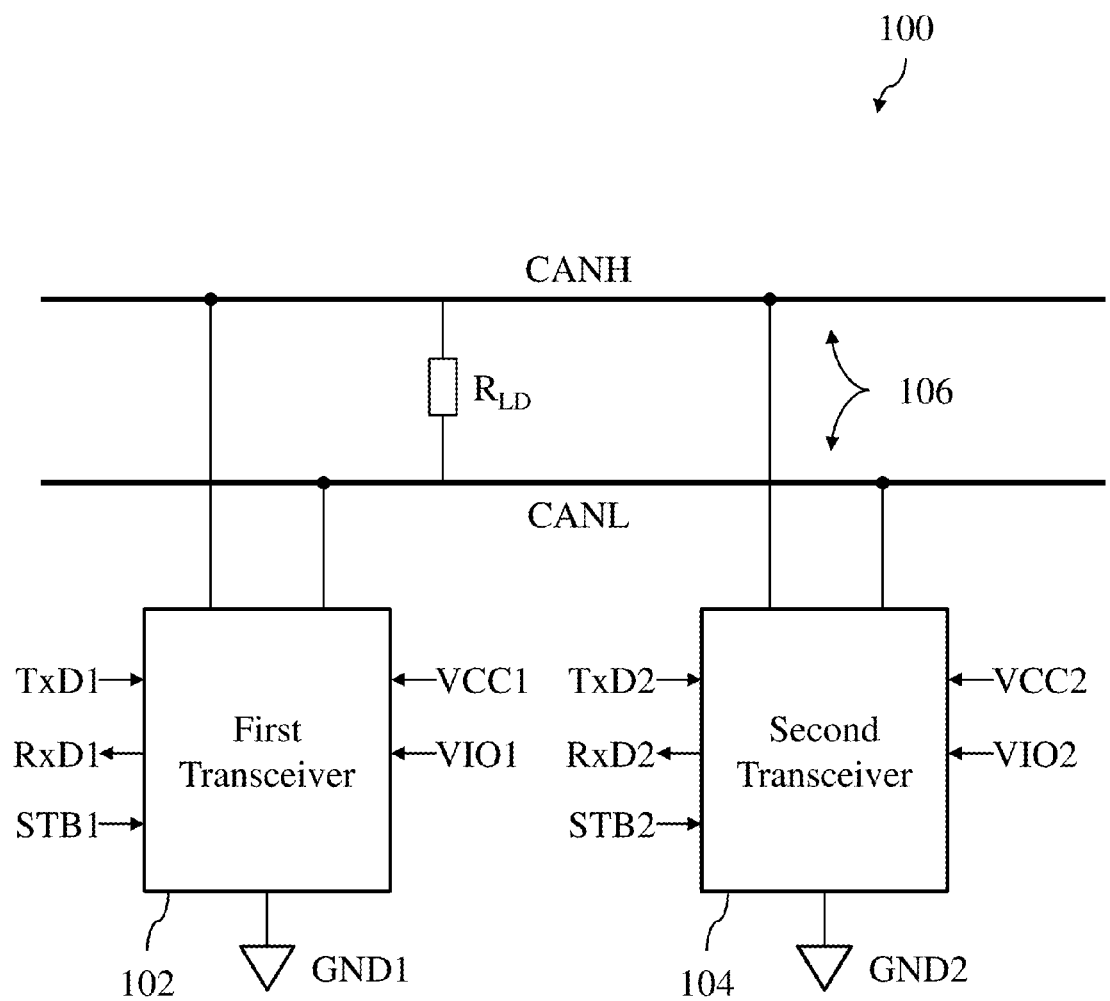
FIG. 1 illustrates a system diagram of an embodiment two-wire network.

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely electronic signaling, and more particularly, operation on a controller area network (CAN) bus. Some of the various embodiments described herein include transceivers for a CAN bus, operation of a two-wire CAN bus, reducing electromagnetic frequency (EMF) emissions during operation of a CAN bus, and transceivers for a two-wire CAN bus with reduced EMF emissions. In other embodiments, aspects may also be applied to other applications involving any type of electronic signaling, electronic network, or communication system including any kind of digital bus according to any fashion as known in the art.

When electrical switching signals are transmitted on an electrical connection, EMF emissions may be generated. For example, when digital signals are transmitted on a transmission line, such as a bus wire, EMF emissions may be generated with similar frequency as the switching frequency of the digital signal. As the frequency of signal switching increases and the length of the transmission line increases, EMF emissions may cause interference or produce other challenges. As a further example, a CAN bus may include signals switching at high frequencies, such as on the order of kilohertz or megahertz, and may include bus lines or wires that are centimeters or meters in length.

According to various embodiments described herein, operations and circuits are described with reduced EMF emissions. In some embodiments, a two-wire CAN bus with a high wire CANH and a low wire CANL is monitored during signal transmission and a common mode voltage is measured from high wire CANH and low wire CANL when a dominant phase is present on the CAN bus. The dominant phase may be identified when the voltage difference between high wire CANH and low wire CANL is greater than a signal threshold, for example. The recessive phase may be identified when the voltage difference between high wire CANH and low wire CANL is below the signal threshold, for example. In various embodiments, the common mode voltage on the CAN bus is measured when the dominant phase is present and reference bias voltages applied to the CAN bus by receiver units attached to the CAN bus are adjusted based on the measured common mode voltage on the CAN bus.

In some embodiments, by adjusting the reference bias voltage applied to the CAN bus by the receiver units, variations in the common mode voltage between the recessive state, which is influenced by the reference bias voltages applied by the receiver units, and the dominant state, which is influenced by a transmitter unit that is transmitting, may be reduced. Setting the common mode voltage in the recessive phase based on the common mode voltage in the dominant phase may reduce common mode variations and, thereby, reduce EMF emissions caused by common mode variations. The embodiments described herein include some example implementations of circuits and methods for measuring and biasing a digital two-wire bus in some specific contexts. A person of skill in the art will recognize the applicability of embodiment techniques beyond the specific circuits and methods described herein.

FIG. 1 illustrates a system diagram of an embodiment two-wire network 100 including first transceiver 102 and second transceiver 104 coupled to CAN bus 106, which includes high wire CANH and low wire CANL. According to various embodiments, two-wire network 100 is configured to operate according to the various CAN protocols for bus communication. First transceiver 102 and second transceiver 104 may be configured to operate as transmitter or receiver. The CAN protocol includes frames or telegrams that include various phases, as known to those of skill in the art. In particular, each CAN telegram includes an arbitration phase and a data phase, among others, for example.

In an example embodiment, first transceiver 102 and second transceiver 104 attempt to transmit data across CAN bus 106 simultaneously. During the arbitration phase of the CAN telegram, both the first transceiver 102 and the second transceiver 104 transmit priority values on CAN bus 106. Based on the arbitration phase, the transmitter with higher priority continues transmitting into the data phase and the transmitter with lower priority stops transmitting and continues receiving. In various embodiments, each node may constantly receive data regardless of which node is transmitting. As an example, first transceiver 102 has a higher priority for a first CAN telegram and continues transmitting during the data phase of the first telegram while second transceiver 104 receives.

According to an embodiment, first transceiver 102 transmits data TxD1 on CAN bus 106. Second transceiver 104 receives transmitted TxD1 over CAN bus 106 and outputs the received data as data RxD2. Both first transceiver 102 and second transceiver 104 may be coupled to various components operating on CAN bus 106 and communicating data between components. Additionally, both first transceiver 102 and second transceiver 104 receive supply voltages VCC1 and VCC2, respectively, low reference voltages GND1 and GND2, respectively, and input/output (I/O) reference voltages VIO1 and VIO2, respectively. In some embodiments, I/O reference voltages VIO1 and VIO2 may be omitted and supply voltages VCC1 and VCC2 may be used for I/O references, for example. First transceiver 102 and second transceiver 104 may include enable or standby control inputs STB1 and STB2, respectively. In various embodiments, the reference and supply voltages applied to each transceiver, or network node, on a CAN bus may have different values. For example, a first voltage regulator coupled to first transceiver 102 may apply a 5.5 V supply voltage between supply voltage VCC1 and low reference voltage GND1 while a second voltage regulator coupled to second transceiver 104 may apply a 4.5 V supply voltage between supply voltage VCC2 and low reference voltage GND2.

In various embodiments, load resistor RLD is coupled between high wire CANH and low wire CANL. In some embodiments, load resistor RLD has a resistance of 60Ω. In other embodiments, the resistance of load resistor RLD may be other values. In a particular embodiment, load resistor RLD may be replaced with a resistive divider circuit with a capacitor coupled to a center node of the resistive divider circuit.

According to various embodiments, when a transceiver, such as first transceiver 102 or second transceiver 104, is transmitting, the non-transmitting transceivers, or receivers, may measure common mode voltage VCM on CAN bus 106 from high wire CANH and low wire CANL. Based on the measured common mode voltage VCM, each transceiver/receiver may adjust a reference bias voltage applied to CAN bus 106 by the transceiver/receiver. In some embodiments, receiving nodes, such second transceiver 104 when first transceiver 102 is transmitting, may perform common mode voltage VCM measurement during the data phase of a CAN telegram and adjust the reference bias voltage based on the measured common mode voltage.

According to various embodiments, first transceiver 102 and second transceiver 104 are examples for a networked system operating on CAN bus 106 that may include any number of transceivers. Further, in other embodiments, various other bus protocols may be implemented instead of the various CAN protocols while applying similar embodiment techniques described herein.

Figure 2A:
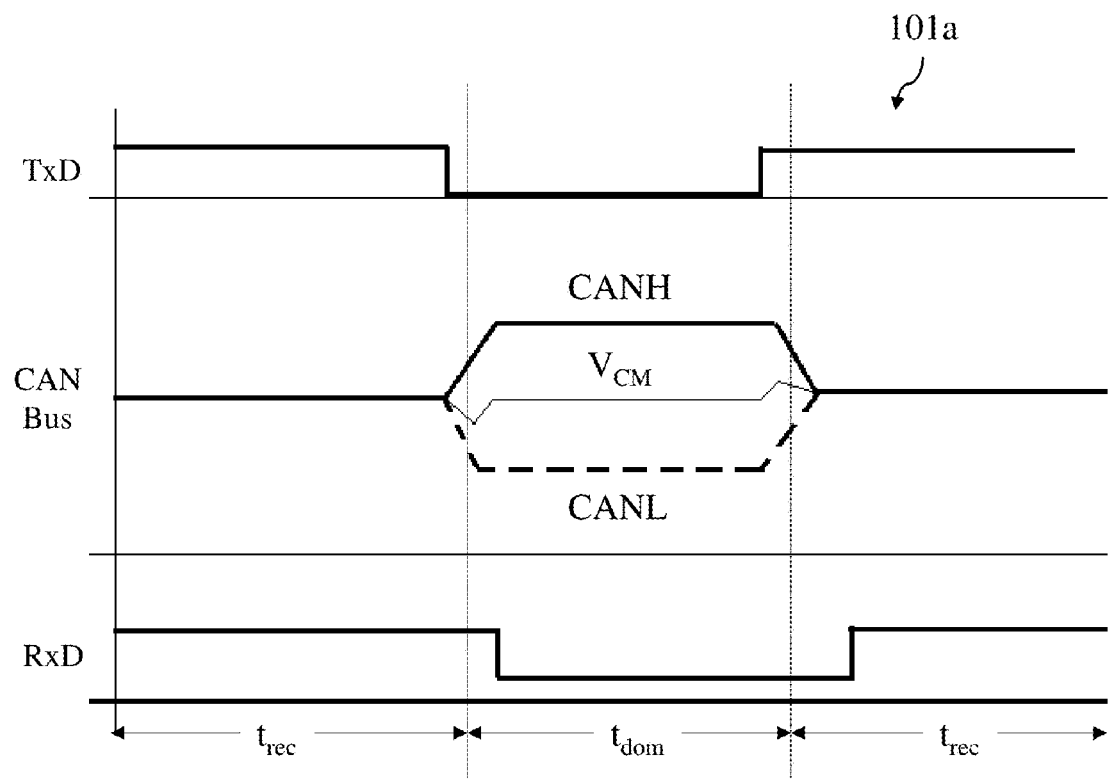
FIGS. 2a and 2b illustrate waveform diagrams of two-wire network signals.
Figure 2B:
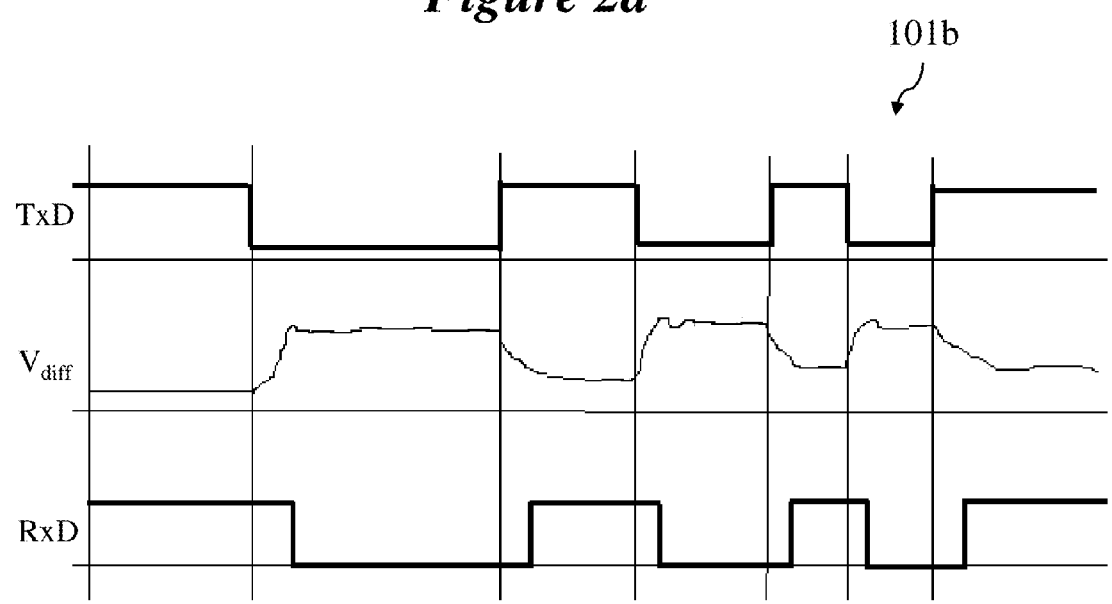

FIGS. 2a and 2b illustrate waveform diagrams of two-wire network signals. According to various embodiments, waveform diagram 101a in FIG. 2a illustrates signals on a CAN bus. During time $t_{rec}$, a recessive signal is present on the CAN bus and high wire CANH and low wire CANL have the same, or approximately the same, signal level. When a recessive signal is present during time $t_{rec}$, common mode signal, or voltage, VCM may have a first value in some cases. Further, during time $t_{rec}$, transmitted data signal TxD is shown as logic high, or 1, and received data signal RxD is also shown as logic high.

During time $t_{dom}$, a dominant signal is present on the CAN bus and high wire CANH and low wire CANL have different signal levels. When a dominant signal is present during time $t_{dom}$, common mode voltage VCM may have a second value different from the first value in time $t_{rec}$, and may especially vary during the bit transitions on high wire CANH and low wire CANL. In such embodiments, the symmetry of the transitions on high wire CANH and low wire CANL may affect common mode voltage VCM. Further, during time $t_{dom}$, transmitted data signal TxD is shown as logic low, or 0, which corresponds to the signals on high wire CANH and low wire CANL. After a short delay, received data signal RxD transitions to logic low based on transmitted data signal TxD that is received over the CAN bus.

According to various embodiments, waveform diagram 101b in FIG. 2b illustrates a series of bit transmissions on the CAN bus. Difference signal Vdiff illustrates the voltage difference between high wire CANH and low wire CANL. While transmitted data signal TxD conveys data on the CAN bus, difference signal Vdiff represents the data conveyed on the CAN bus. A CAN protocol handler may be included in a transceiver unit. The protocol handler may operate to identify CAN telegrams and organize sampling times. Based on a protocol handler, received data signal RxD may be sampled at specific sampling points. For a CAN protocol, generally each bit is given a certain bit time. A protocol handler may control a transceiver to arrange sampling points at between 70% and 80% of the bit time during a CAN telegram in order to sample each bit of the transmitted data. In other embodiments, sampling points may be arranged at any point in the bit time. Further, as know by those of skill in the art, the operation of a protocol handler may be modified for different protocols, such as CAN with flexible data rate (CAN FD).

Figure 3A:
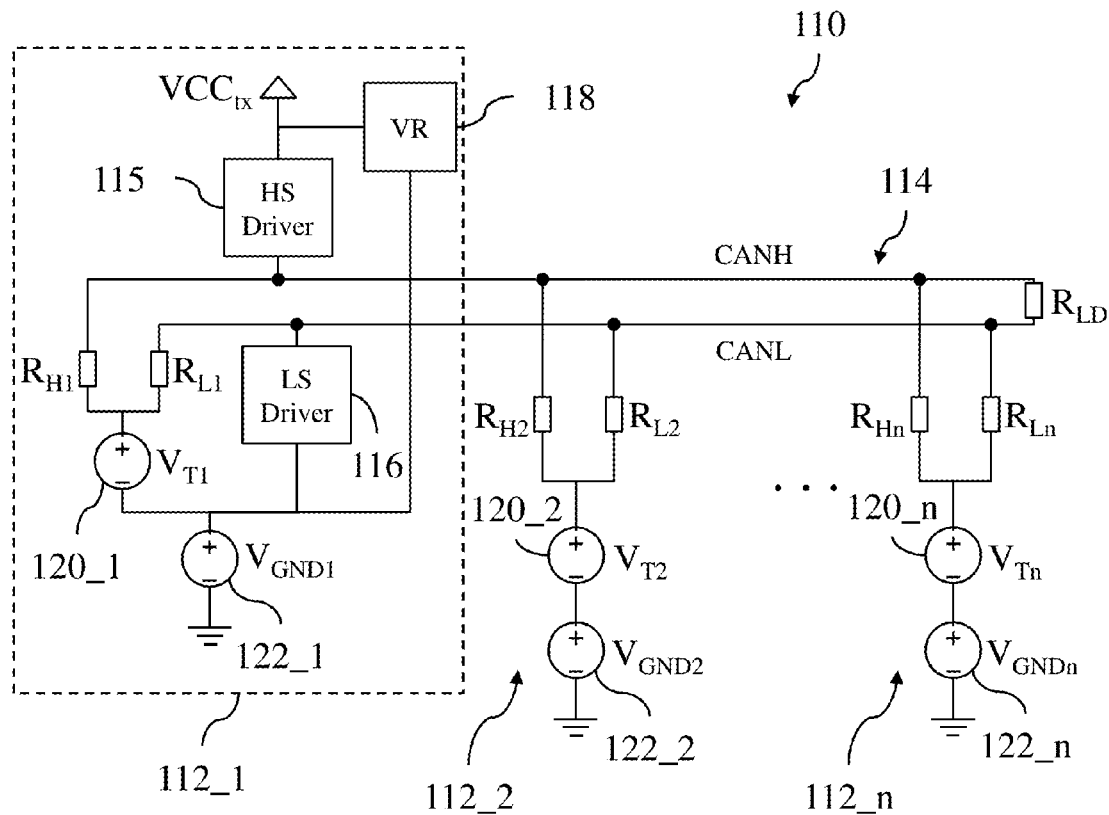
FIGS. 3a and 3b illustrate a network model and a waveform diagram for a two-wire network.
Figure 3B:
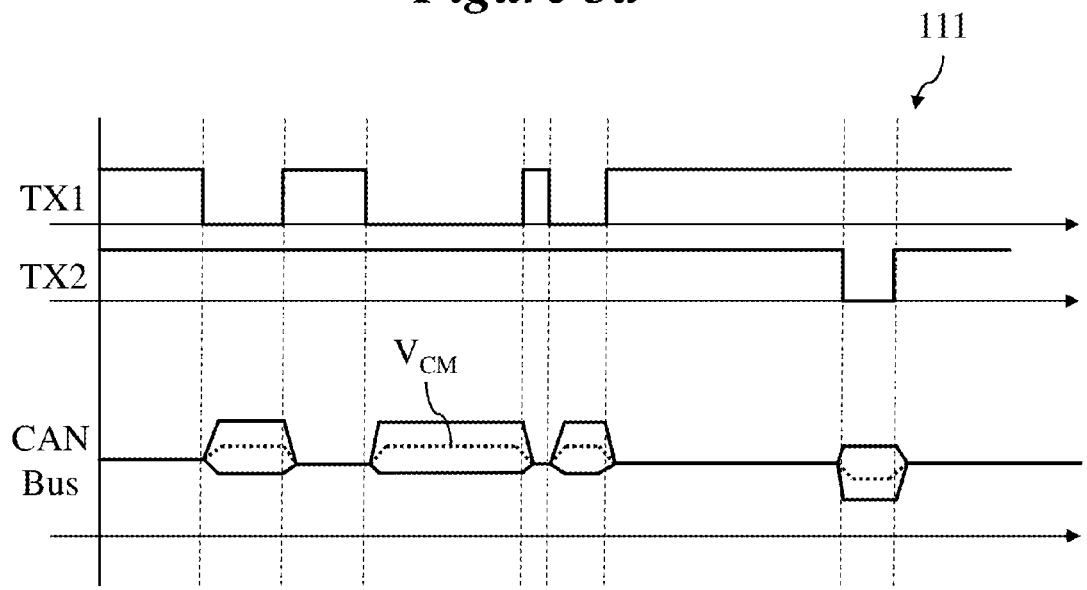

FIGS. 3a and 3b illustrate a network model for a two-wire network 110 and an accompanying waveform diagram 111. Two-wire network 110 includes transceivers 112_1-112_n coupled to CAN bus 114, which includes high wire CANH, low wire CANL, and load resistor RLD coupled between high wire CANH and low wire CANL. In two-wire network 110, transceiver 112_1 is modeled as a transmitter while transceivers 112_2-112_n are modeled as receivers. Based on this model, transceiver 112_1, i.e., the transmitter, includes a high-side driver 115 and low-side driver 116 coupled to high wire CANH and low wire CANL, respectively, and supplied through voltage regulator 118 with a supply voltage equal to VCCtx–VGND1.

Transceivers 112_1-112_n set reference bias voltages at each respective CAN bus node through resistors RH1-RHn and RL1-RLn based on reference bias supplies 120_1-120_n, which provide bias voltages VT1-VTn, and low reference supplies 122_1-122_n, which model reference voltages VGND1-VGNDn. Reference voltages VGND1-VGNDn are reference voltages for each respective node and are provided by ground (GND) connections for each node, for example. In some embodiments, each of reference, or ground, voltages VGND1-VGNDn may have a different value. During times when recessive signals are on CAN bus 114, common mode voltage VCM on CAN bus is more strongly influenced by bias voltages VTi and reference voltages VGNDi. During times when dominant signals are on CAN bus 114, common mode voltage VCM may be more strongly influenced by the transmitter, i.e., transceiver 112_1, and, more specifically, by the supply voltage equal to VCCtx-VGND1, high-side driver 115, low-side driver 116, and load resistor RLD. In some embodiments, high-side driver 115 may have an ON resistance of approximately 20Ω, low-side driver 116 may have an ON resistance of approximately 20Ω, and load resistor RLD may have a resistance of 60Ω. In various embodiments, common mode voltage VCM from high wire CANH and low wire CANL may be calculated as follows. The voltage on high wire CANH may be calculated using the equation $$VCANH=VCCtx \cdot (1-RHSon \div (RHSon+RLSon+RLD))+VGND1,$$

and the voltage on low wire CANL may be calculated using the equation $$VCANL=VCCtx \cdot (RLSon \div (RHSon+RLSon+RLD))+VGND1,$$

where RHSon is the ON resistance of high-side driver 115 and RLSon is the ON resistance of low-side driver 116. Using these values for VCANH and VCANL, common mode voltage VCM may be calculated using the equation $$VCM=(VCANH+VCANL) \div 2 = (VCCtx \div 2)+VGND1,$$

when the ON resistance of high-side driver 115 (RHSon) equals the ON resistance of low-side driver 116 (RLSon).

When CAN bus 114 exhibits switching between dominant and recessive signals present between high wire CANH and low wire CANL, common mode voltage VCM may jump or move to different values because common mode voltage VCM is more strongly influenced by different components with different voltage supplies in the recessive state and the dominant state, and the different voltage supplies may not include the same supply or reference voltages at each node. In a network including multiple nodes, i.e., n nodes for transceivers 112_1-112_n, each node may correspond to a separate component with separate voltage regulators and supplies. Thus, according to various embodiments, the common mode voltage VCM is measured during a time when a dominant signal is on CAN bus 114 and reference bias supplies 120_1-120_n are adjusted based on the measured common mode voltage VCM in order to reduce jumps or variations in the common mode voltage on CAN bus 114.

Based on the model for two-wire network 110, waveform diagram 111 illustrates first data transmission signal TX1 originating from a first transceiver, such as transceiver 112_1, and second data transmission signal TX2 originating from a second transceiver, such as transceiver 112_2. As shown, when the data transmission signal transitions to a logic low state, the CAN bus, such as CAN bus 114, transitions to the dominant state and common mode voltage VCM jumps or varies. According to various embodiments, common mode voltage VCM is measured during the dominant state and the reference bias voltages applied from the various nodes coupled to the CAN bus may be adjusted based on the measured common mode voltage VCM in order to reduce the jump between dominant and recessive states on the CAN bus.

According to various embodiments, second data transmission signal TX2 originates from a second transceiver and the corresponding common mode voltage VCM jump is not equal to the jump in common mode voltage VCM originating from the first transceiver. Thus, in various embodiments, the reference bias voltage applied at each node may be updated repeatedly based on measured common mode voltages VCM measured during different CAN telegrams originating from multiple transceivers. Various embodiment transceiver circuits and reference bias circuits are described further herein below in reference to the figures.

Figure 4:
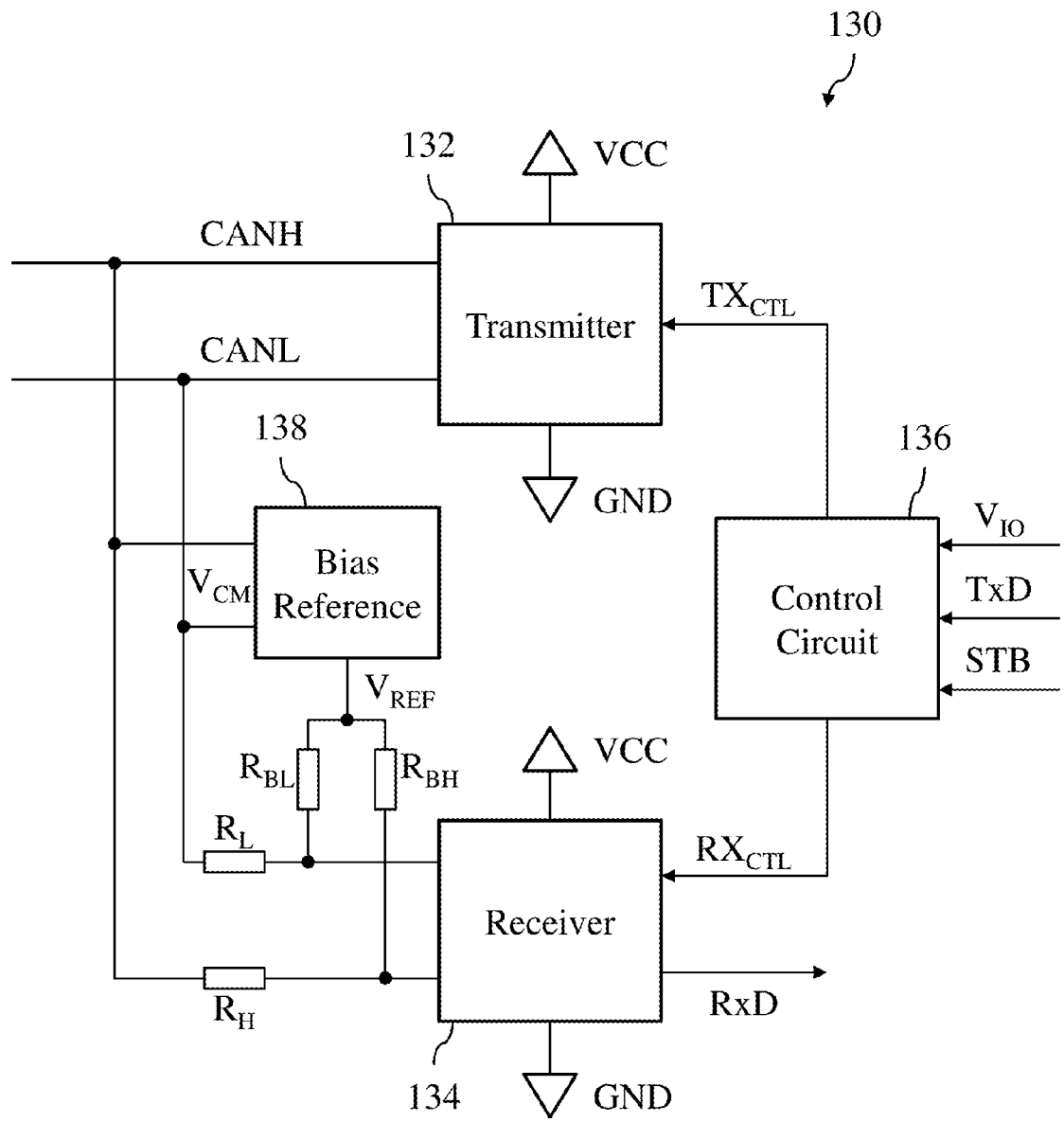
FIG. 4 illustrates a block diagram of an embodiment transceiver circuit.

FIG. 4 illustrates a block diagram of an embodiment transceiver circuit 130 including transmitter 132, receiver 134, control circuit 136, and bias reference circuit 138. According to various embodiments, transceiver 130 transmits signals over high wire CANH and low wire CANL from transmitter 132 and receives signals over high wire CANH and low wire CANL at receiver 134. Transmit data signal TxD and control signals for transmission are supplied to transmitter 132 through transmission signal TXCTL from control circuit 136. Similarly, control signals for receiving are supplied to receiver 134 through receiver signal RXCTL from control circuit 136 in order to obtain receive data signal RxD.

According to various embodiments, bias reference circuit 138 measures or samples common mode voltage VCM from high wire CANH and low wire CANL and adjusts reference bias voltage VREF applied to high wire CANH and low wire CANL based on the measured common mode voltage VCM. In such embodiments, common mode voltage VCM may be measured during a dominant state, while reference bias voltage VREF is adjusted in order to influence common mode voltage VCM during a recessive state. In one embodiment, bias reference circuit 138 measures common mode voltage VCM during a dominant state when transmitter 132 is inactive and receiver 134 is active and receiving. In other embodiments, bias reference circuit 138 may measure common mode voltage VCM during dominant states driven by transmitter 132 as well.

In some specific embodiments, the voltage on high wire CANH is designated as VCANH, the voltage on low wire CANL is designated VCANL, and common mode voltage VCM is given by the expression, VCM=(VCANH+VCANL)÷2. In one particular embodiment, reference bias voltage VREF is adjusted to be equal to the measured common mode voltage VCM from a dominant state. According to various embodiments, bias reference circuit 138 may measure or sample common mode voltage VCM according to numerous embodiments, such as described below in reference to the other figures. Reference bias voltage VREF may be applied through high bias resistor RBH and low bias resistor RBL. In some embodiments, high bias resistor RBH and low bias resistor RBL may have resistance values ranging from 100Ω to 3 kΩ In a specific embodiment, high bias resistor RBH and low bias resistor RBL may each have a resistance value of about 1 kΩ.

In various embodiments, resistors RH and RL are included between receiver 134 and high wire CANH and low wire CANL, respectively. In some specific embodiments, resistors RH+RBH and RL+RBL may have resistance values ranging from 5 kΩ to 50 kΩ such as defined by the ISO-11898-5 standard, for example. In various embodiments, resistors RH and RL with high bias resistor RBH and low bias resistor RBL work as an input divider for receiver 134 in order to divide and shift the voltage at the CAN bus, which can be between −40 V and +40 V for example, to a suitable level, such as between 1.5 V and 3.5 V for example, for a comparator included in receiver 134. In some embodiments, RH vs. RBH and RL vs. RBL may be set based on a ratio between the resistors. In some embodiments, the ratio may be about 20, i.e., RH/RBH=20 and RL/RBL=20. In other embodiments, the ratios may have different values. As one example, when VCC=5 V, VREF=2.5 V, RH/RBH=20, and RL/RBL=20, then a variation of the bus levels CANH and CANL between −40V and 40V means a variation at the input of the receiver between:

$$2.5\ V+(40\ V-2.5\ V)\cdot(RH\div(RBH+RH))=2.5+37.5\cdot(1/21)=4.28\ V,$$

and $$2.5\ V+(-2.5\ V-40\ V)\cdot(RL\div(RL+RBL))=0.47\ V.$$

As a further example, if RH+RBH=20 kΩ and RH/RBH=20, then RBH=RH/21=952Ω and RH=19.04 kΩ. In one specific embodiment, resistors RH+RBH and RL+RBL have a resistance value of 20 kΩ. In other alternative embodiments, resistors RH+RBH and RL+RBL may have other resistance values.

In some embodiments, transceiver 130 may be a package product or included in a packaged product. In various embodiments, I/O reference voltages VIO, enable or standby control input STB, transmit data signal TxD, supply voltage VCC, and low reference voltage GND may be provided from interface circuits or through pins coupled to a transceiver package or integrated circuit (IC). As described above, multiple transceivers similar to transceiver 130 may be coupled to a CAN bus. In some embodiments, each transceiver may receive different or slightly different supply voltages VCC or low reference voltages GND. In some embodiments, some transceivers may have a common earth ground coupled to low reference voltage GND and receive a different supply voltage VCC, for example. In various embodiments, each transceiver 130 may be in different system with different supply voltages and control signals suited to the specific device or application for the respective system. Thus, various embodiment transceivers adjust reference bias voltage VREF in order to reduce common mode voltage VCM variations despite operating with different voltage supplies.

Figure 5:
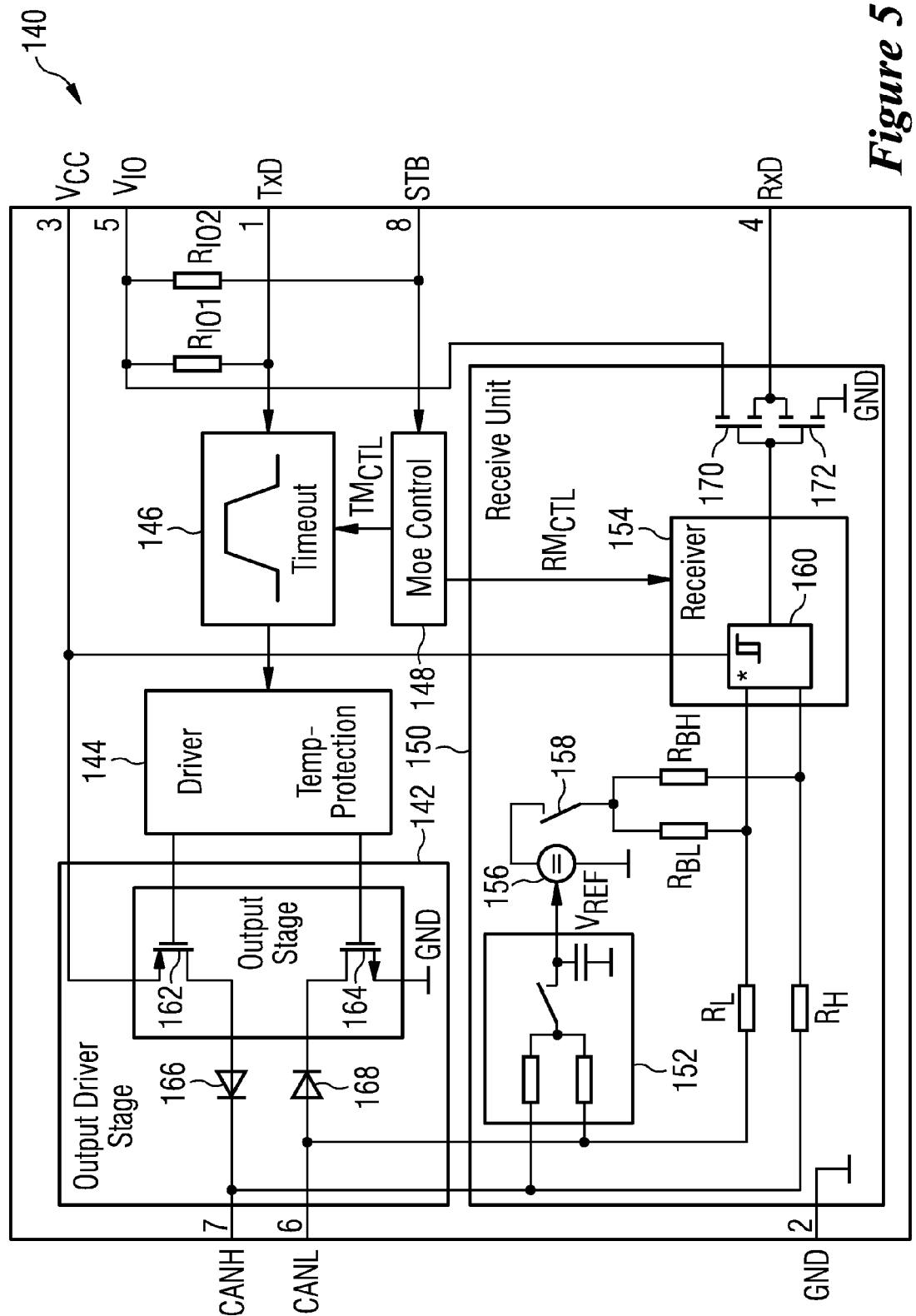
FIG. 5 illustrates a schematic diagram of another embodiment transceiver circuit.

FIG. 5 illustrates a schematic diagram of another embodiment transceiver circuit 140 including output driver stage 142, driver 144, timeout circuit 146, mode control 148, and receiving unit 150. According to various embodiments, receiving unit 150 includes common mode measurement circuit 152 and receiver 154, which are coupled to high wire CANH and low wire CANL. Common mode measurement circuit 152 measures or samples common mode voltage VCM from high wire CANH and low wire CANL. In some embodiments, common mode measurement circuit 152 is a sample and hold type of circuit, as indicated in FIG. 5. In other embodiments, common mode measurement circuit 152 may include numerous variations as described in reference to sampling circuit 212 in FIGS. 7-14 below.

In various embodiments, based on the measured or sampled common mode voltage VCM, voltage controlled voltage source (VCVS) 156 is controlled by an output of common mode measurement circuit 152 to adjust reference bias voltage VREF that is applied to high wire CANH and low wire CANL through bias switch 158, high bias resistor RBH, and low bias resistor RBL, respectively.

In some embodiments, receiver unit 154 includes comparator 160 that may exhibit a hysteresis response for generating a drive signal for output transistors 170 and 172, which drive receive data signal RxD at an output terminal or pin. In some embodiments, transistor 170 may be a p-type device and transistor 172 may be an n-type device. For example, transistors 170 and 172 may be p-type and n-type, respectively, metal-oxide-semiconductor field effect transistors (MOSFETs), or the like. In other embodiments, transistors 170 and 172 may be other device types and also may include any type of transistor. In some embodiments, receiver unit 154, including comparator 160, is supplied by supply voltage VCC and controlled by receiver mode control RMCTL from mode control 148.

In various embodiments, mode control 148 also provides transmitter mode control TMCTL to control timeout circuit 146, which conveys transmit data signal TxD to driver 144 and prevents a permanent dominant state from being driven on the bus by disabling output driver stage 142 after a defined timeout period. Driver 144 may also provide over-temperature protection. I/O voltage VIO is coupled to transistor 170, through I/O resistor RIO2 to standby or enable terminal STB, and through I/O resistor RIO1 to the terminal conveying transmit data signal TxD.

In various embodiments, when transceiver circuit 140 is transmitting, driver 144 generates drive signals for high side transistor 162 and low side transistor 164 based on transmit data signal TxD. The output of transistor 162 drives high wire CANH high (supply voltage VCC) through diode 166 and the output of transistor 168 drives low wire CANL low (low reference voltage GND) through diode 168. Transceiver circuit 140 is an embodiment implementation and the specific configuration may be rearranged, with various transistor types and circuit components. Such variations and rearrangements are included within the scope of envisioned embodiments.

Figure 6:
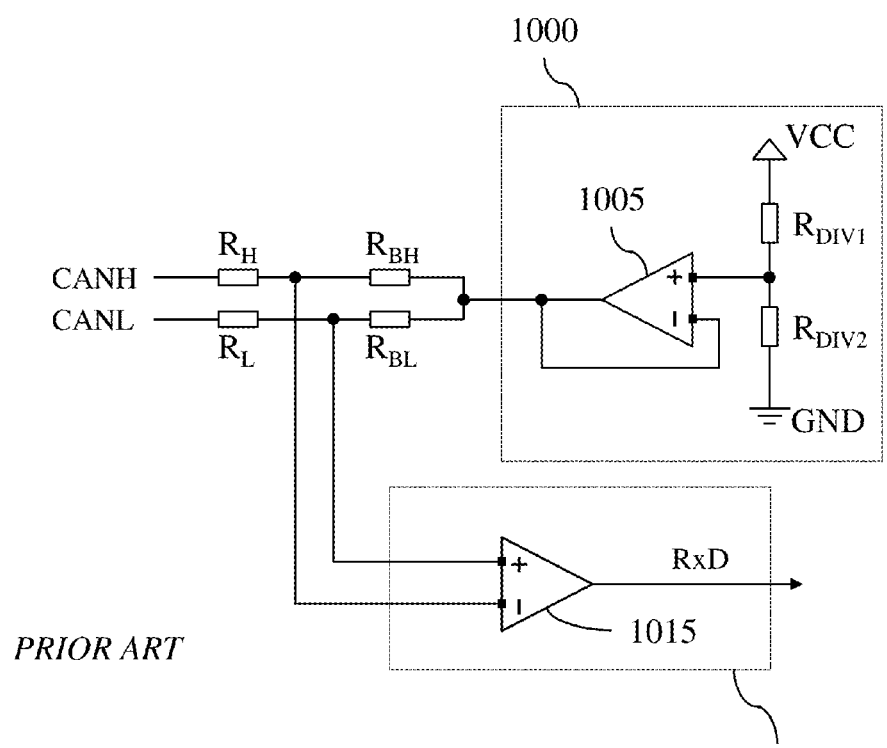
FIG. 6 illustrates a schematic diagram of a reference bias circuit according to the prior art.

FIG. 6 illustrates a schematic diagram of reference bias circuit 1000 and receiver circuit 1010 coupled to a CAN bus according to the prior art. Reference bias circuit 1000 includes feedback bias opamp 1005, voltage divider resistor RDIV1, and voltage divider resistor RDIV2. When the two resistors have equal resistance, voltage divider resistors RDIV1 and RDIV2 split the supply voltage and provide (VCC−GND)÷2 to the positive input terminal of feedback bias opamp 1005.

Feedback bias opamp 1005 includes negative feedback from the output terminal to the negative input terminal in order to regulate the voltage at the output terminal to (VCC−GND)÷2, which may be simplified to VCC÷2 when GND is taken as the ground or zero potential node. In such cases, reference bias circuit 1000 provides VCC÷2 through high bias resistor RBH, low bias resistor RBL, high resistor RH, and low resistor RL to high wire CANH and low wire CANL. Receiver circuit 1010 also receives signals from high wire CANH and low wire CANL through high resistor RH and low resistor RL at receiving comparator 1015. When receiving comparator 1015 receives signals above a specific threshold, receive data signal RxD transitions to indicate the received dominant state signal. Thus, receive data signal RxD provides digital signals based on recessive and dominant states on the CAN bus.

Figure 7:
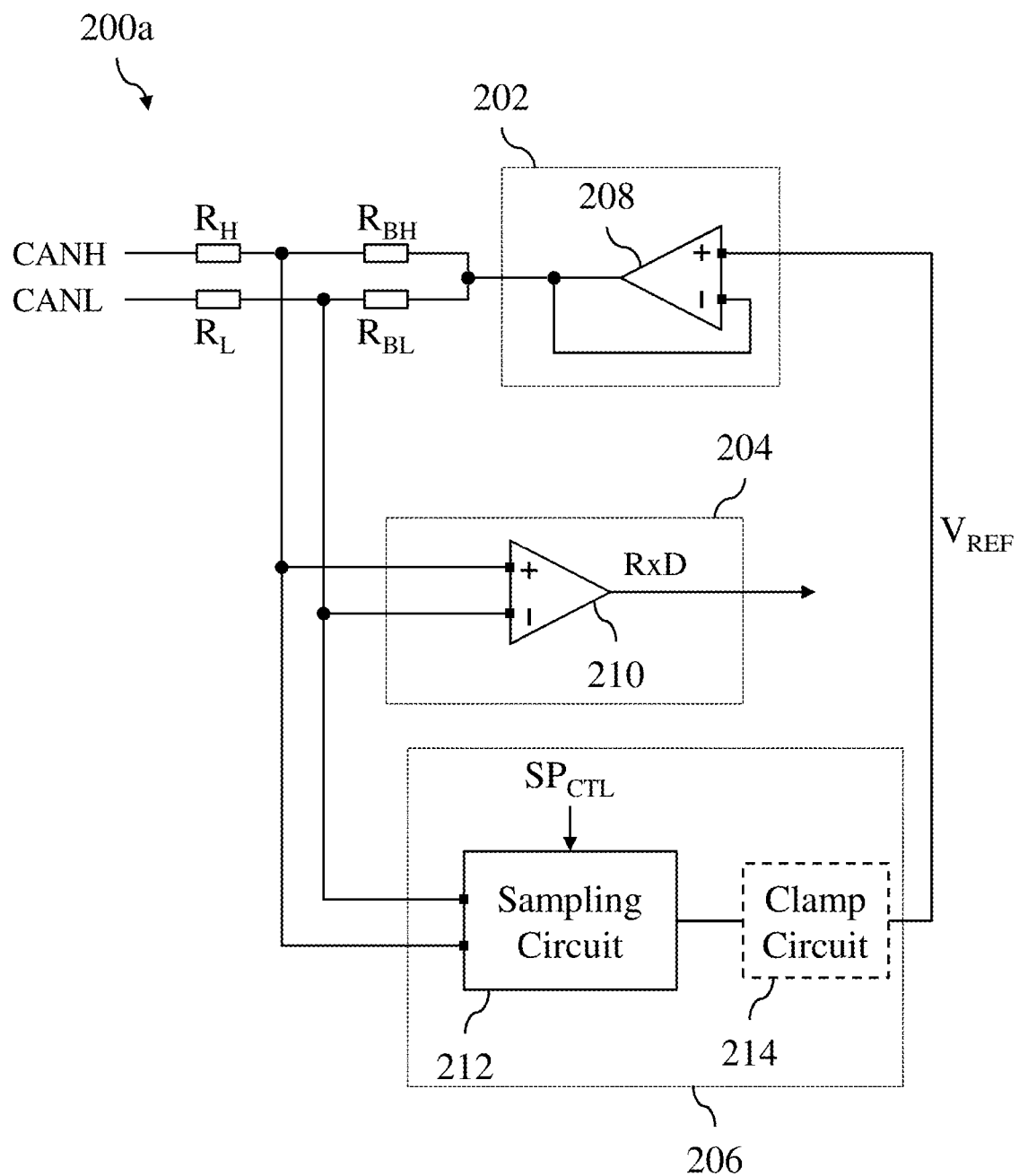
FIG. 7 illustrates a schematic diagram of an embodiment reference bias circuit.

FIG. 7 illustrates a schematic diagram of an embodiment reference bias circuit 200*a* including bias circuit 202, receiver circuit 204, and reference circuit 206. Bias circuit 202, receiver circuit 204, and reference circuit 206 are each coupled to the CAN bus, including high wire CANH and low wire CANL, through high resistor RH and low resistor RL. According to various embodiments, bias circuit 202 applies reference bias voltage VREF to the CAN bus using feedback opamp 208. Reference bias voltage VREF is generated by reference circuit 206. In the various embodiments described in reference to FIGS. 7-14, an additional switching connection may be coupled between an embodiment reference bias circuit and the CAN bus to apply the reference bias voltage VREF during certain phases or states as described in reference to bias switch 158 in FIG. 5, for example.

In various embodiments, reference circuit 206 includes sampling circuit 212 that measures common mode voltage VCM and generates reference bias voltage VREF based on the measured common mode voltage VCM. In some embodiments, sampling circuit 212 may measure common mode voltage VCM using various measurement techniques. Various embodiment techniques for measuring and sampling common mode voltage VCM are described further herein below in reference to the other figures. In various embodiments, sampling circuit 212 may sample common mode voltage VCM based on a sampling control signal SPCTL, which may be provided according to various embodiments by receiver circuit 204, an additional comparator, or a protocol handler, for example.

In various embodiments, sampling circuit 212 may be controlled to sample or measure common mode voltage VCM during dominant states on the CAN bus. In some embodiments, sampling or measuring is performed during data phases of CAN telegrams. In some specific embodiments, sampling or measurement of common mode voltage VCM is not performed in the arbitration phase of CAN telegrams. In a still more specific embodiment, sampling or measurement of common mode voltage VCM is only performed in the data phase of CAN telegrams. In some embodiments, sampling circuit 212 is controlled by sampling control signal SPCTL to sample only during dominant states on the CAN bus. In various embodiments, sampling circuit 212 may be one implementation of common mode measurement circuit 152, as described above in reference to FIG. 5.

In some embodiments, an optional clamp circuit 214 may be included after sampling circuit 212 in order to limit reference bias voltage VREF to a set voltage range. In one embodiment, clamp circuit 214 limits reference bias voltage VREF to range from 2 V to 3 V. In such embodiments, clamp circuit 214 will supply reference bias voltage VREF from the output of sampling circuit 212 to feedback opamp 208 when the output of sampling circuit 212 is between 2 V and 3 V. When the output of sampling circuit 212 is below 2 V or above 3 V, clamp circuit 214 clamps reference bias voltage VREF to 2 V or 3 V, respectively. In other embodiments, clamp circuit 214 may limit reference bias voltage VREF to a range that is outside of the 2 V to 3 V range. In some embodiments, clamp circuit 214 is omitted from an embodiment reference bias circuit.

Receiver circuit 204 includes receiver comparator 210, which generates receive data signal RxD based on dominant and recessive signals on the CAN bus. As an example, receiver comparator 210 may generate a signal corresponding to a dominant state when the difference between high wire CANH and low wire CANL is greater than a threshold of 0.7 V. In other embodiments, receiver comparator 210 may have other threshold voltages.

Figure 8A:
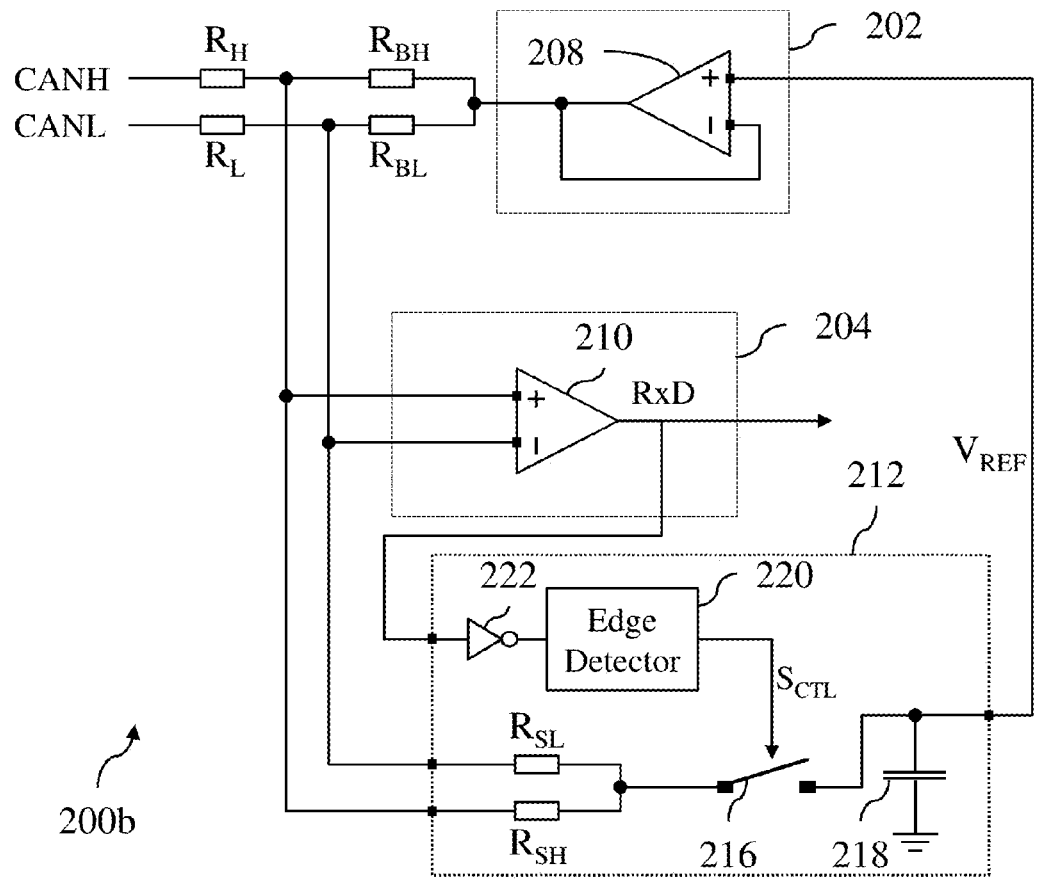
FIGS. 8a and 8b illustrate a schematic diagram of another embodiment reference bias circuit and an accompanying waveform diagram.
Figure 8B:
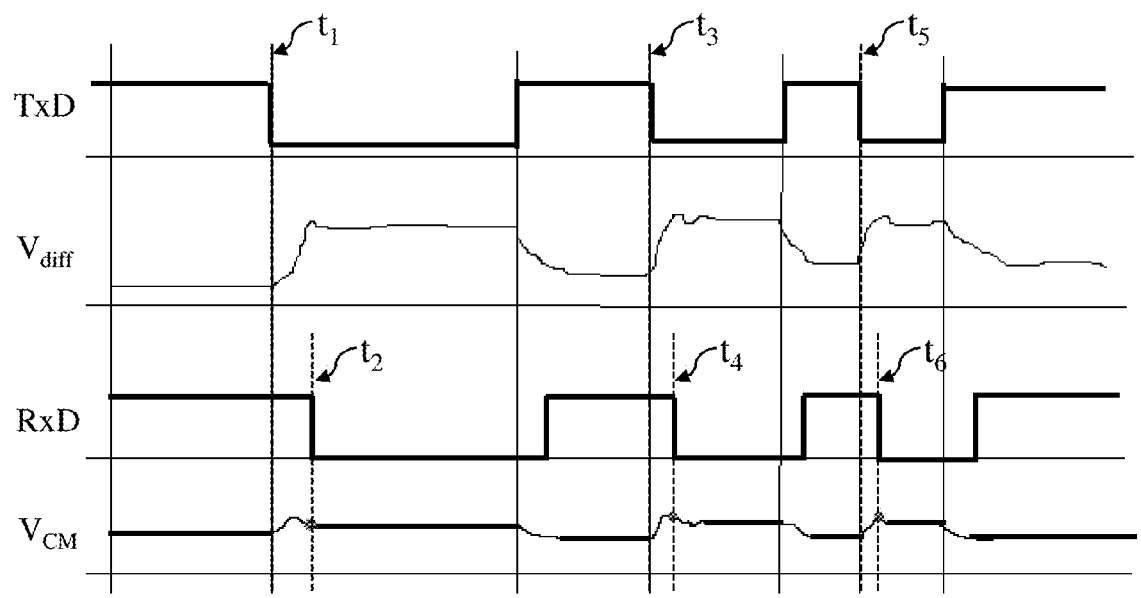

FIGS. 8a and 8b illustrate a schematic diagram of another embodiment reference bias circuit 200b and an accompanying waveform diagram. According to some embodiments, reference bias circuit 200b includes reference circuit 202, receiver circuit 204, and sampling circuit 212, which operate similar to corresponding components described hereinabove in reference to FIG. 7. In an embodiment, sampling circuit 212 includes edge detection circuit 220, sampling switch 216, and sampling capacitor 218. Sampling circuit 212 may also include inverter 222, high sampling resistor RSH, and low sampling resistor RSL. In various embodiments, edge detection circuit 220 may be a rising edge detector in order to initiate sampling of common mode voltage VCM only during the dominant phase.

In such embodiments, sampling circuit 212 samples common mode voltage VCM from the CAN bus on sampling capacitor 218 when sampling switch 216 is closed. Edge detection circuit 220 and inverter 222 generate switch control SCTL, which controls sampling switch 216, based on detected edges from receive data signal RxD. In an embodiment, when the CAN bus transitions to a dominant state, receiver circuit 204 generates a falling edge in receive data signal RxD. Based on the falling edge detected through inverter 222, edge detector 220 drives switch control SCTL to close, thereby sampling switch 216. In such embodiments, common mode voltage VCM on the CAN bus is sampled on sampling capacitor 218.

Corresponding to embodiment reference bias circuit 200b illustrated in FIG. 8a, the waveform diagram illustrated in FIG. 8b depicts relevant signals for explanation purposes. In various embodiments, transmit data signal TxD is driven onto the CAN bus as shown. Transmit data signal TxD transitions on the CAN bus at time t1 in order to enter the dominant state, as shown by difference signal Vdiff, which is the voltage difference between high wire CANH and low wire CANL. As difference signal Vdiff rises, the voltage difference between high wire CANH and low wire CANL triggers receiver circuit 204 to correspondingly generate a falling edge in receive data signal RxD at time t2. The falling edge in receive data signal RxD at time t2 also triggers sampling circuit 212 to trigger a pulse for switch control SCTL to sample the common mode voltage VCM on sampling capacitor 218.

In various embodiments, common mode voltage VCM may have variation, as shown, and sampling when receive data signal RxD experiences a falling edge may avoid sampling common mode voltage VCM during more significant variations or voltage transients. The waveform diagram shown in FIG. 8b further illustrates repeated sampling instances. Transmit data signal TxD exhibits a falling edge at time t3 and receive data signal RxD exhibits the corresponding falling edge at time t4, which triggers another sampling of common mode voltage VCM at time t4. Similarly, transmit data signal TxD exhibits another falling edge at time t5 and receive data signal RxD exhibits the corresponding falling edge at time t6, which triggers a further sampling of common mode voltage VCM at time t6. In various embodiments, sampling circuit 212 is configured such that edges corresponding to dominant states on the CAN bus trigger sampling of common mode voltage VCM. In specific embodiments, sampling circuit 212 only samples common mode voltage VCM during dominant states on the CAN bus. In other alternative embodiments, sampling circuit 212 samples common mode voltage VCM at any time during operation. In some embodiments, a delay block (not shown) may be included between edge detector 220 and sampling switch 216 in order to delay the sampling further into the dominant phase.

Figure 9:
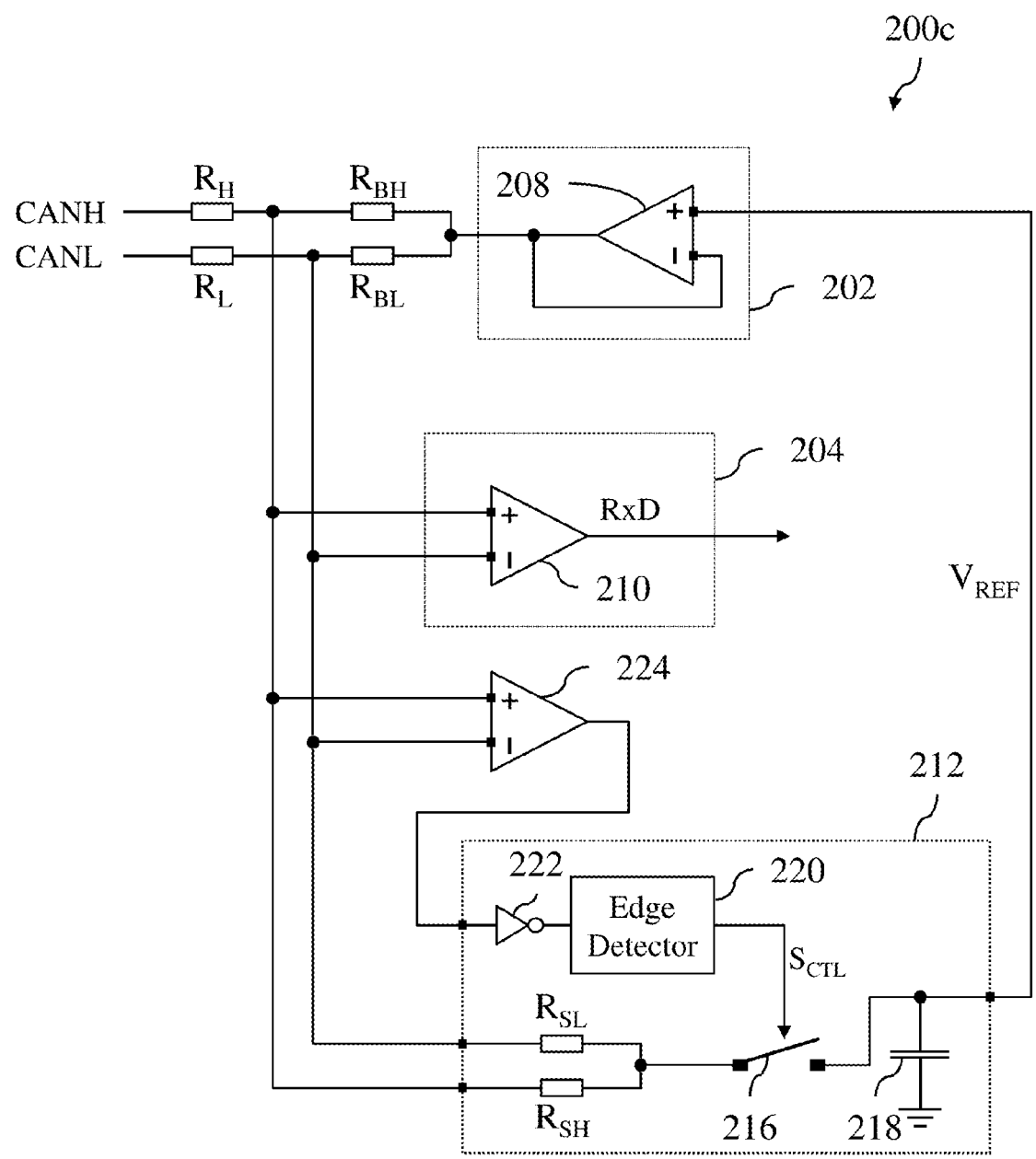
FIG. 9 illustrates a schematic diagram of a further embodiment reference bias circuit.

FIG. 9 illustrates a schematic diagram of a further embodiment reference bias circuit 200c including reference circuit 202, receiver circuit 204, and sampling circuit 212, which operate similar to corresponding components described hereinabove in reference to FIGS. 7, 8a, and 8b. According to an embodiment, reference bias circuit 200c also includes sampling comparator 224. In this embodiment, the output of sampling comparator 224 is used as the input to edge detector 220. In various embodiments, receiver circuit 204 may generate receive data signal RxD based on a first threshold from receiver comparator 210, as described hereinabove. In such embodiments, sampling comparator 224 generates output signals based on signals on the CAN bus, similar to receiver comparator 210, based on a second threshold. The second threshold is greater than the first threshold is some embodiments. When receive data signal RxD exhibits a falling edge, the output of sampling comparator 224 may also exhibit a falling edge after a short delay. The short delay originates from the increased time taken for the voltage difference, during dominant and recessive state transitions, between high wire CANH and low wire CANL to reach the higher voltage of the second threshold of sampling comparator 224 compared to the first threshold of receiver comparator 210. As an example, receiver comparator 210 may have a voltage threshold of 0.7 V while sampling comparator 224 may have a voltage threshold of 1.4 V. In various embodiments, numerous voltage values for both thresholds may be used. In an alternative embodiment, the first threshold from receiver comparator 210 is greater than the second threshold from sampling comparator 224.

As described hereinabove in reference to FIGS. 8a and 8b, common mode voltage VCM may exhibit variations. By using a higher second threshold with sampling comparator 224, sampling may be performed after some or all significant variations in common mode voltage VCM occurring during dominant and recessive state transitions on the CAN bus.

Figure 10A:
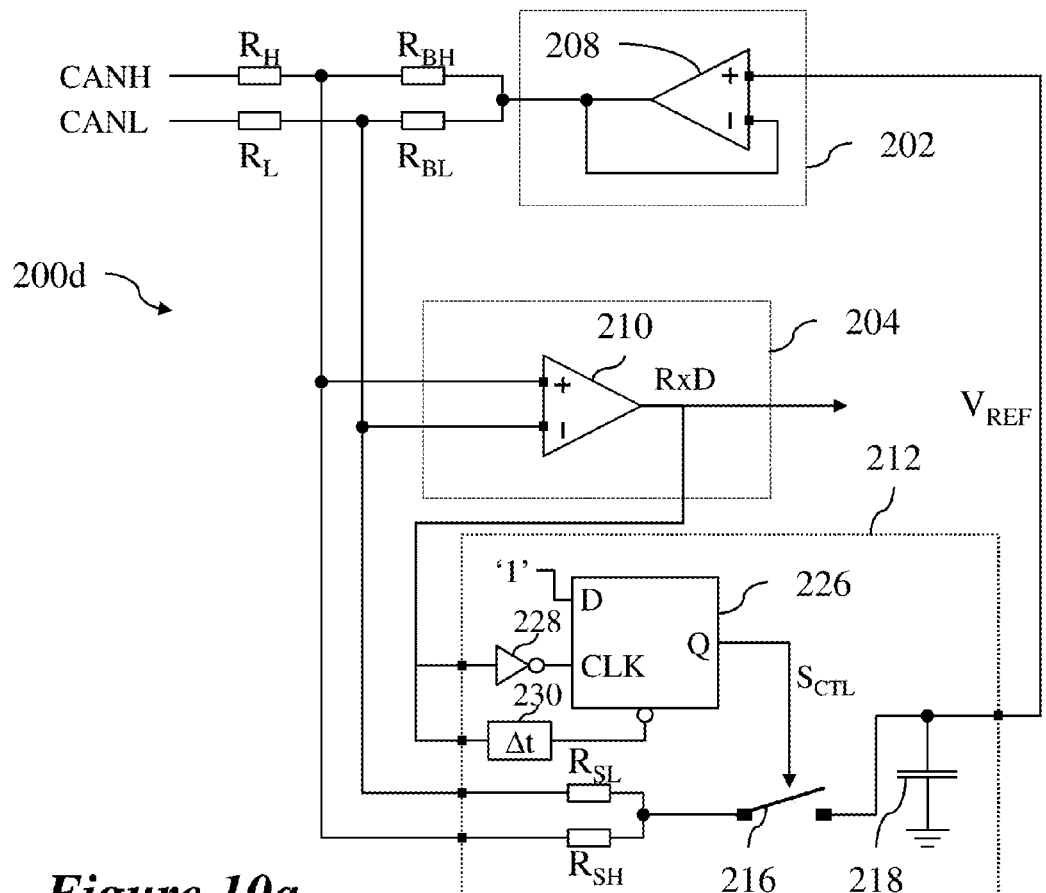
FIGS. 10a and 10b illustrate a schematic diagram of yet another embodiment reference bias circuit and an accompanying waveform diagram.
Figure 10B:
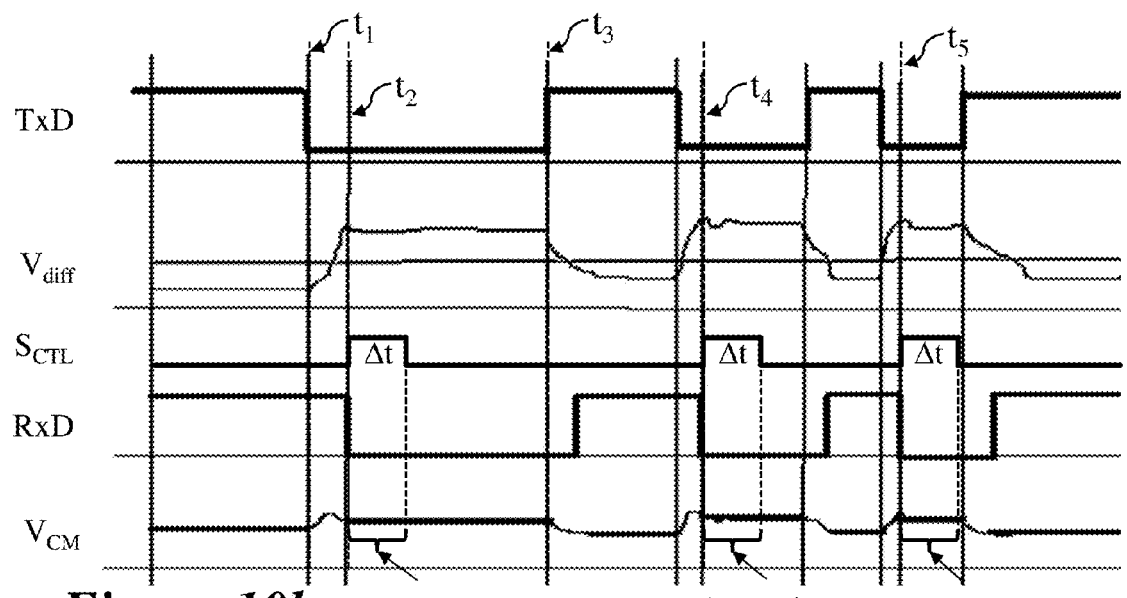

FIGS. 10a and 10b illustrate a schematic diagram of yet another embodiment reference bias circuit 200d and an accompanying waveform diagram. According to some embodiments, reference bias circuit 200d includes reference circuit 202 and receiver circuit 204, which operate similar to corresponding components described hereinabove in reference to FIGS. 7, 8a, and 8b, and reference bias circuit 200d also includes sampling circuit 212, which includes a further embodiment implementation. In such an embodiment, sampling circuit 212 in reference bias circuit 200d is configured to perform an averaging function during a sampling time. In such embodiments, sampling circuit 212 may include flip flop 226, inverter 228, delay circuit 230, high sampling resistor RSH, low sampling resistor RSL, sampling switch 216, and sampling capacitor 218.

According to various embodiments, as similarly described hereinabove in reference to FIGS. 8a and 8b, when receive data signal RxD exhibits a falling edge resulting from a recessive to dominant state transition on the CAN bus, sampling circuit 212 is controlled by receive data signal RxD. Based on receive data signal RxD, flip flop 226 receives an input clock signal from inverter 228 causing the output of flip flop 226 to drive switch control SCTL to close sampling switch 216. Flip flop 226 continues driving sampling switch 216 in the conducting state during the dominant state on the CAN bus until delay circuit 230 generates a reset of flip flop 226. In such embodiments, sampling capacitor 218 may provide an averaging function of common mode voltage VCM during the dominant state on the CAN bus.

Corresponding to embodiment reference bias circuit 200d illustrated in FIG. 10a, the waveform diagram illustrated in FIG. 10b depicts relevant signals for explanation purposes. In various embodiments, transmit data signal TxD is driven onto the CAN bus from a transmitting node as shown. In FIG. 10b, transmit data signal TxD transitions on the CAN bus at time t1 in order to enter the dominant state, as similarly described hereinabove in reference to FIG. 8b and shown by difference signal Vdiff. As difference signal Vdiff rises, this voltage difference between high wire CANH and low wire CANL triggers receiver circuit 204 to correspondingly generate a falling edge in receive data signal RxD at time t2. The falling edge in receive data signal RxD at time t2 also triggers sampling circuit 212 to begin sampling common mode voltage VCM on sampling capacitor 218 and delay circuit 230 to initiate a delay time. In such embodiments, flip flop 226 continues driving sampling switch 216 to allow sampling capacitor 218 to provide a low pass filtering function, or an averaging function, until delay circuit 230 generates a reset signal for flip flop 226 after delay time $\Delta t$.

As similarly described hereinabove in reference to FIG. 8b, common mode voltage VCM may have variation, as shown in FIG. 10b, particularly during recessive to dominant state transitions. In some embodiments, averaging the measured common mode voltage VCM during the dominant state on the CAN bus may generate a more accurate common mode voltage VCM measurement. As shown, averaging begins at time t2 based on receive data signal RxD and ends at time t2+$\Delta t$ based on delay circuit 230 resetting flip flop 226. Sometime after t2+$\Delta t$, at time t3, transmit data signal TxD transitions back to a logic high state in order to return to the recessive state on the CAN bus. FIG. 10b also illustrates additional averaging common mode voltage VCM measurements initiated at time t4 and time t5, corresponding to falling edges of receive data signal RxD. In some alternative embodiments, the averaging is performed during shorter or longer durations during the dominant state on the CAN bus. For example, in alternative embodiments, sampling circuit 212 may be controlled to measure and average common mode voltage VCM during any portion of the time between the falling edge of receive data signal RxD at time t2 and the rising edge of transmit data signal TxD at time t3. In other embodiments, common mode voltage VCM may be measured and averaged using other circuit configurations.

Figure 11A:
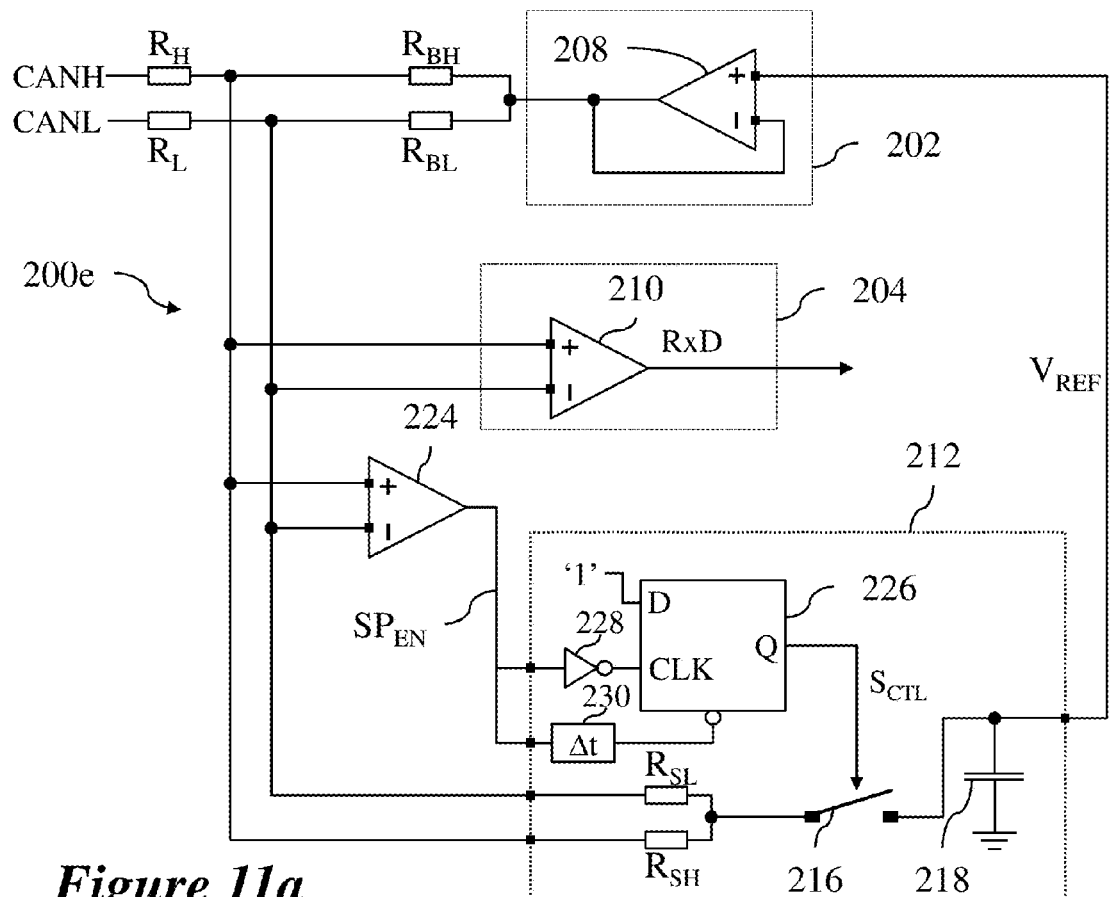
FIGS. 11a and 11b illustrate a schematic diagram of a still further embodiment reference bias circuit and an accompanying waveform diagram.
Figure 11B:
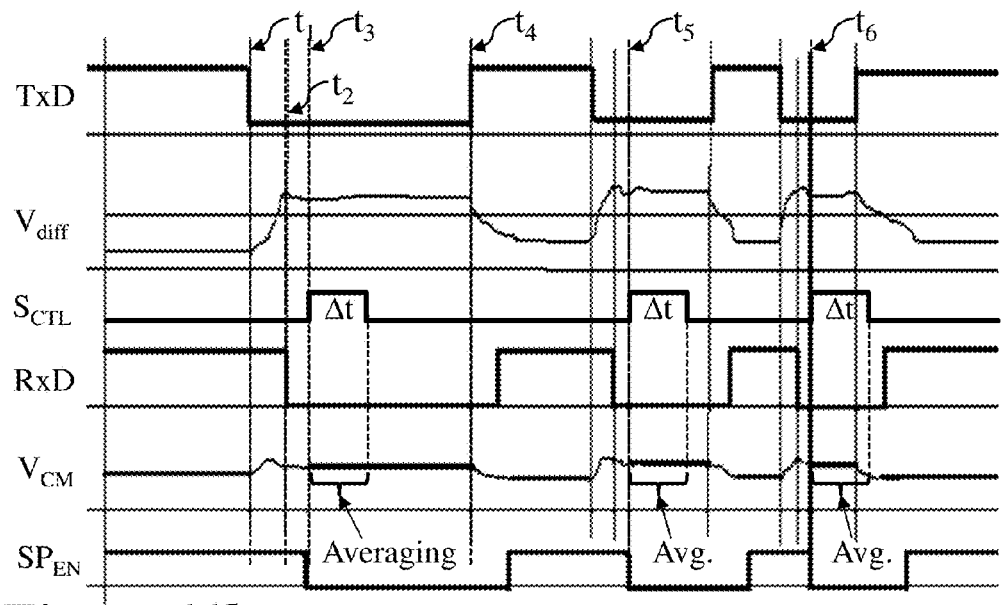

FIGS. 11a and 11b illustrate a schematic diagram of a still further embodiment reference bias circuit 200e and an accompanying waveform diagram. According to some embodiments, reference bias circuit 200e includes reference circuit 202, receiver circuit 204, and sampling circuit 212, which operate similar to corresponding components described hereinabove in reference to FIGS. 10a and 10b, and reference bias circuit 200e also includes sampling comparator 224 as described hereinabove in reference to FIG. 9. In such embodiments, reference bias circuit 200e operates to measure and average common mode voltage VCM in a similar manner as described in reference to reference bias circuit 200d, but using a second threshold from sampling comparator 224 to begin the measurement.

The second threshold of sampling comparator 224 may be higher than the first threshold of receiver comparator 210. In such embodiments, the receive data signal RxD transitions when the difference between high wire CANH and low wire CANL exceeds the first threshold and the output of sampling comparator 224 transitions, in order to begin measuring and averaging common mode voltage VCM in sampling circuit 212, when the difference between high wire CANH and low wire CANL exceeds the second threshold.

The first threshold may be 0.7 V and the second threshold may be 1.4 V, for example. In some embodiments, the first threshold may range from 0.5 V to 1 V and the second threshold may range from 1 V to 2 V. In other embodiments, the first and second thresholds may each take other values outside these ranges. In one alternative embodiment, the second threshold may be less than the first threshold.

Corresponding to embodiment reference bias circuit 200e illustrated in FIG. 11a, the waveform diagram illustrated in FIG. 11b depicts relevant signals for explanation purposes. In various embodiments, transmit data signal TxD is driven onto the CAN bus from a transmitting node as shown. Transmit data signal TxD transitions on the CAN bus at time t1 in order to enter the dominant state, as described hereinabove and shown by difference signal Vdiff. As difference signal Vdiff rises above the first threshold from receiver comparator 210, this voltage difference between high wire CANH and low wire CANL triggers receiver circuit 204 to correspondingly generate a falling edge in receive data signal RxD at time t2. As difference signal Vdiff rises above the second threshold from sampling comparator 224, this voltage difference between high wire CANH and low wire CANL triggers sampling comparator 224 to initiate a measurement in sampling circuit 212 at time t3. In some embodiments, sampling comparator 224 drives an active low sampling enable signal SPEN to provide the clock signal to flip flop 226, through invertor 228, in order to trigger sampling circuit 212 to begin sampling common mode voltage VCM on sampling capacitor 218. In such embodiments, flip flop 226 continues driving sampling switch 216 to allow sampling capacitor 218 to provide a low pass filtering function, or an averaging function, as described hereinabove in reference to reference bias circuit 200d in FIG. 10a. Flip flop 226 may continue driving sampling switch 216 until delay circuit 230, triggered by sampling enable signal SPEN, generates a reset for flip flop 226 at time t3+$\Delta t$. Sometime after t3+$\Delta t$, at time t4, transmit data signal TxD transitions back to a logic high state in order to return to the recessive state on the CAN bus. FIG. 11b also illustrates additional instances of measuring and averaging common mode voltage VCM initiated at time t5 and time t6, corresponding to falling edges of sampling enable signal SPEN occurring when difference signal Vdiff exceeds the second threshold from sampling comparator 224.

Figure 12A:
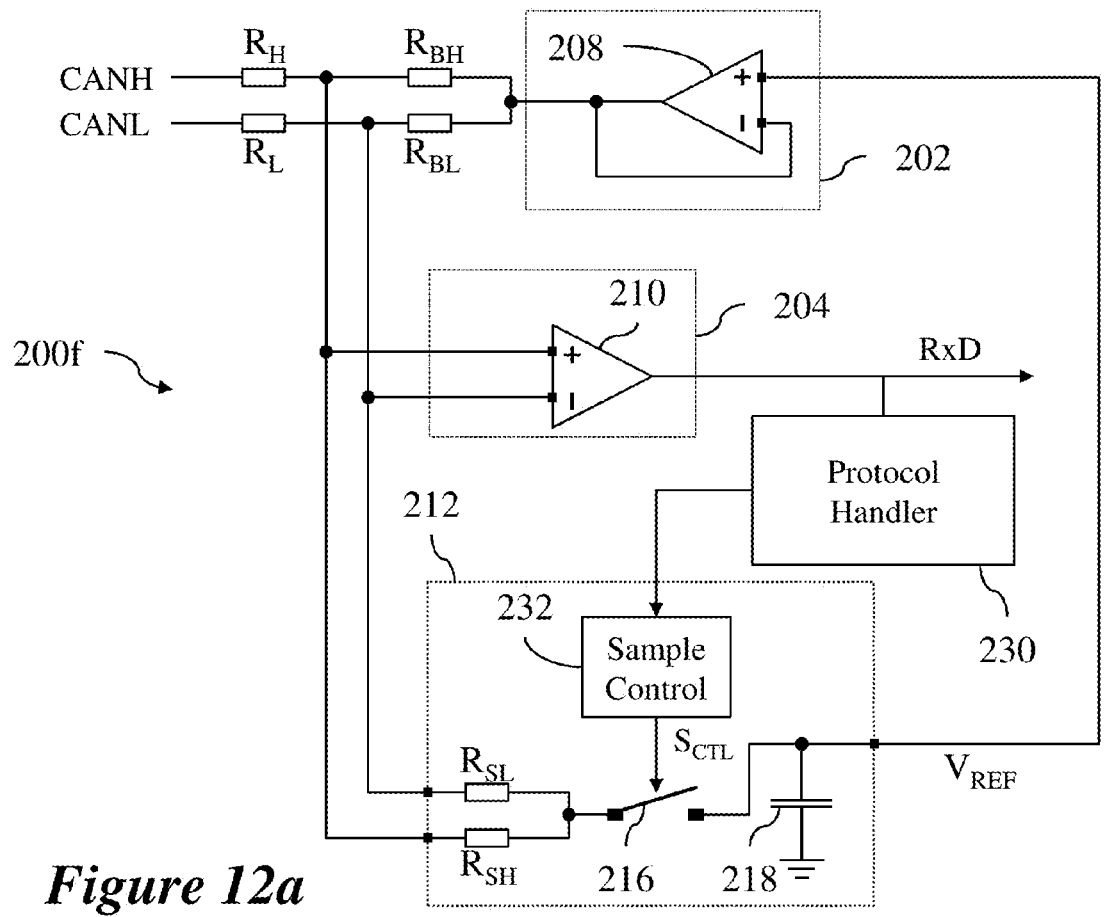
FIGS. 12a and 12b illustrate a schematic diagram of a yet further embodiment reference bias circuit and an accompanying waveform diagram.
Figure 12B:
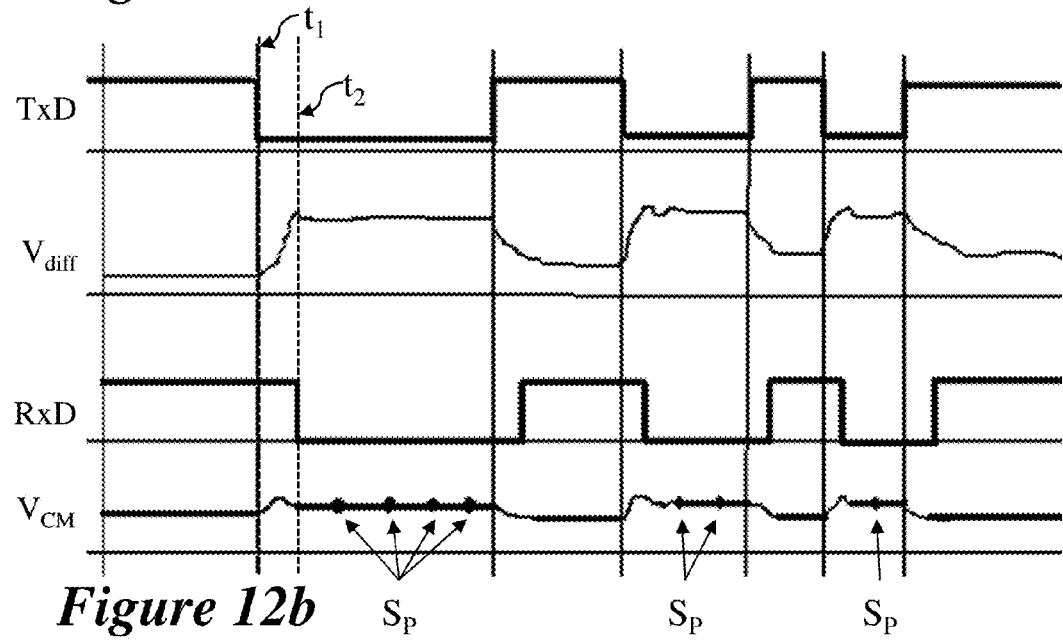

FIGS. 12a and 12b illustrate a schematic diagram of a yet further embodiment reference bias circuit 200f and an accompanying waveform diagram. According to some embodiments, reference bias circuit 200f includes reference circuit 202 and receiver circuit 204, as described hereinabove, and reference bias circuit 200f also includes sampling circuit 212 and protocol handler 230. Protocol handler 230 operates to identify telegrams transmitted across the CAN bus and determine phases of each telegram based on monitoring receive data signal RxD. As described hereinabove in reference to FIG. 2b, protocol handler 230 may operate to organize sampling times by selecting sampling points SP. For example, protocol handler 230 may control a transceiver to arrange sampling points SP at between 70% and 80% of each bit time during a CAN telegram. In other embodiments, sampling points SP are arranged during other portions of each bit time during a CAN telegram.

In such embodiments, sampling circuit 212 includes sample control circuit 232, sampling switch 216, sampling capacitor 218, high sampling resistor RSH, and low sampling resistor RSL. Protocol handler 230 supplies sampling points SP to sample control circuit 232 in order to measure or sample common mode voltage VCM on sampling capacitor 218 by closing sampling switch 216. In some embodiments, sample control circuit 232 may be a simple driver circuit. In other embodiments, sample control circuit 232 may include additional logical control for added control functionality.

Corresponding to embodiment reference bias circuit 200f illustrated in FIG. 12a, the waveform diagram illustrated in FIG. 12b depicts relevant signals for explanation purposes. In various embodiments, transmit data signal TxD is driven onto the CAN bus as shown. Transmit data signal TxD transitions on the CAN bus at time t1 in order to enter the dominant state, as shown by difference signal Vdiff, which is the voltage difference between high wire CANH and low wire CANL. As difference signal Vdiff rises, the voltage difference between high wire CANH and low wire CANL triggers receiver circuit 204 to correspondingly generate a falling edge in receive data signal RxD at time t2. In some embodiments, protocol handler 230 identifies the CAN telegram and the falling edge of receive data signal RxD. Protocol handler 230 generates or sets sampling points SP, for common mode voltage VCM measurement, to occur after the falling edge of receive data signal RxD.

In various such embodiments, as described hereinabove, common mode voltage VCM may exhibit some variation, especially as the values on high wire CANH and low wire CANL are changing, as seen by difference signal Vdiff. Based on the identified bit times, protocol handler generates sampling points SP. Sampling points SP may be used by a downstream controller, output driver, or sampling circuit for sampling receive data signal RxD in order to determine the signal from the CAN telegram in a microcontroller or other circuit coupled to the output of receiver circuit 204. Sampling points SP are also supplied to sample control circuit 232 in order to cause sample control circuit 232 to drive sampling switch 216 to a conducting state, i.e., to close sampling switch 216.

Thus, in various embodiments, common mode voltage VCM is sampled or measured at sampling points SP, i.e., at times corresponding to sampling points SP, as shown in FIG. 12b. Protocol handler 230 may generate or set sampling points SP at a certain percentage of each identified bit time, i.e., an amount of time designated to each bit. For example, protocol handler 230 may generate sampling points SP in a range from 70% to 80% of each bit time. Setting a sampling point SP and measuring common mode voltage VCM during the latter half of a bit time may allow variations of common mode voltage VCM occurring during bit transitions to diminish. In some embodiments, protocol handler 230 may set sampling points SP during portions of each bit time that are outside the range from 70% to 80%. As shown in FIG. 12b, sampling points SP occur, as set by protocol handler 230, during bit times in the dominant state. In such embodiments, protocol handler 230 may generate any number of sampling points for the entire CAN telegram, but sampling of common mode voltage VCM is performed only during dominant states on the CAN bus.

According to various embodiments, protocol handler 230 may introduce various advantages, such as sampling at 70-80% of the bit time, for example, when common mode voltage VCM may be more stable or sampling during phases of the telegram when only a single transmitter is active, such as the data phase, for example. In further embodiments, protocol handler 230 may also include a lookup table (not shown) for storing initial or measured reference bias voltage VREF for various nodes. In such embodiments, for example, protocol handler 230 may use a lookup table to generate reference bias voltage VREF for reference circuit 202 based on a specific node that is transmitting.

Specifically, if a node n is transmitting, protocol handler 230 may use a lookup table to generate reference bias voltage VREF corresponding to node n. Protocol handler 230 obtains the identifier for the transmitting node during the arbitration phase of each CAN telegram. The values stored in the lookup table may be based on an ideal reference bias voltage VREF calculated in advance for each node or may be based on a last measured value for common mode voltage VCM when the respective node n was previously transmitting. In various such embodiments, protocol handler 230 may apply reference bias voltage VREF to reference circuit 202 (connection not shown, see FIG. 13 for example) during an initial time period while sampling circuit 212 measures or samples common mode voltage VCM in real time. When sampling circuit 212 has an updated value for common mode voltage VCM, protocol handler 230 may stop supplying the initial value for reference bias voltage VREF and sampling circuit 212 may supply reference bias voltage VREF as described hereinabove in reference FIGS. 12a and 12b, for example. In various embodiments, protocol handler 230 may update the lookup tables with measured values for each transmitting node based on sampling circuit 212.

Figure 13:
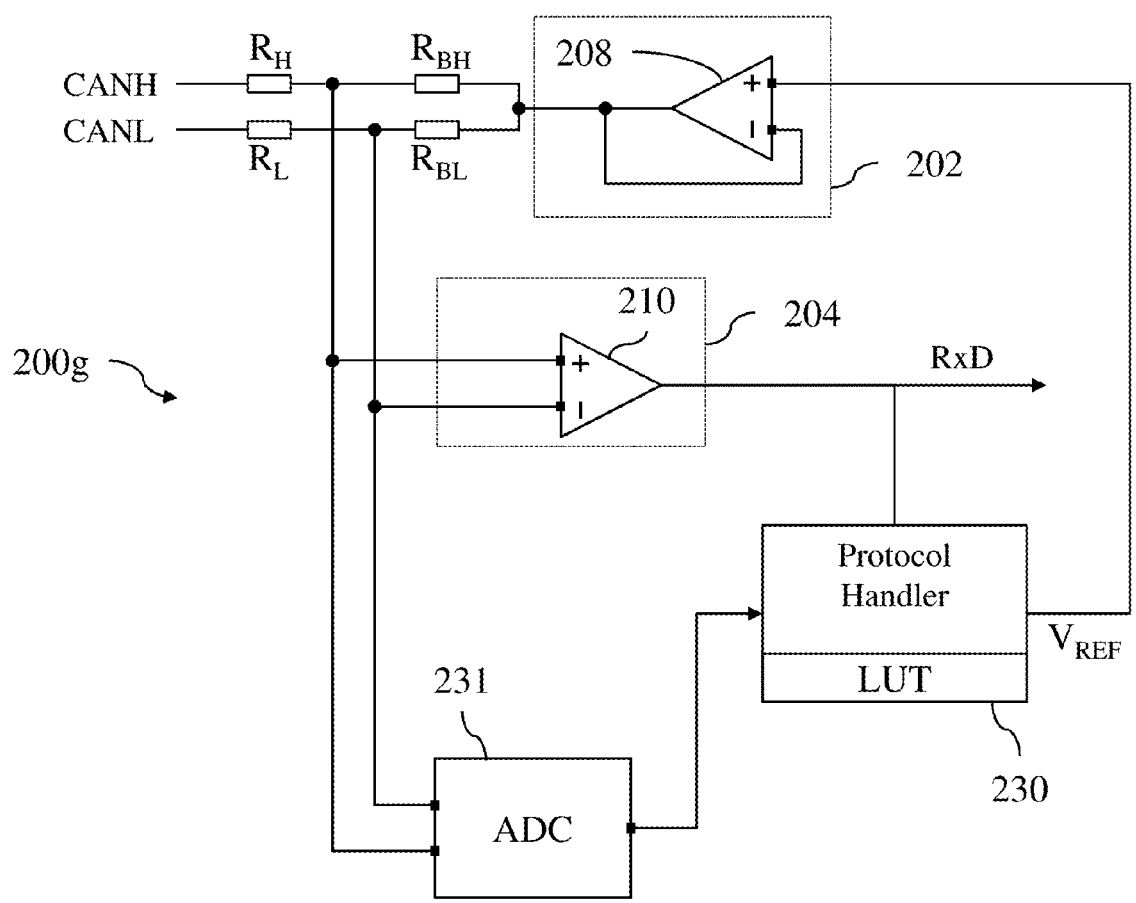
FIG. 13 illustrates a schematic diagram of still another embodiment reference bias circuit.

In still further embodiments, protocol handler 230 may fully bypass the sampling circuit and constantly supply reference bias voltage VREF to reference circuit 202 using lookup tables. In such an embodiment, protocol handler 230 may be coupled to an analog to digital converter (ADC) for measuring common mode voltage VCM from high wire CANH and low wire CANL. Protocol handler 230 updates values in the lookup table based on measured values from the ADC. In accordance with such elements, FIG. 13 illustrates a schematic diagram of still another embodiment reference bias circuit 200g including protocol handler 230 with lookup table LUT and ADC 231. In such embodiments, protocol handler supplies reference bias voltage VREF to reference circuit 202 and sampling circuit 212 may be omitted.

Figure 14:
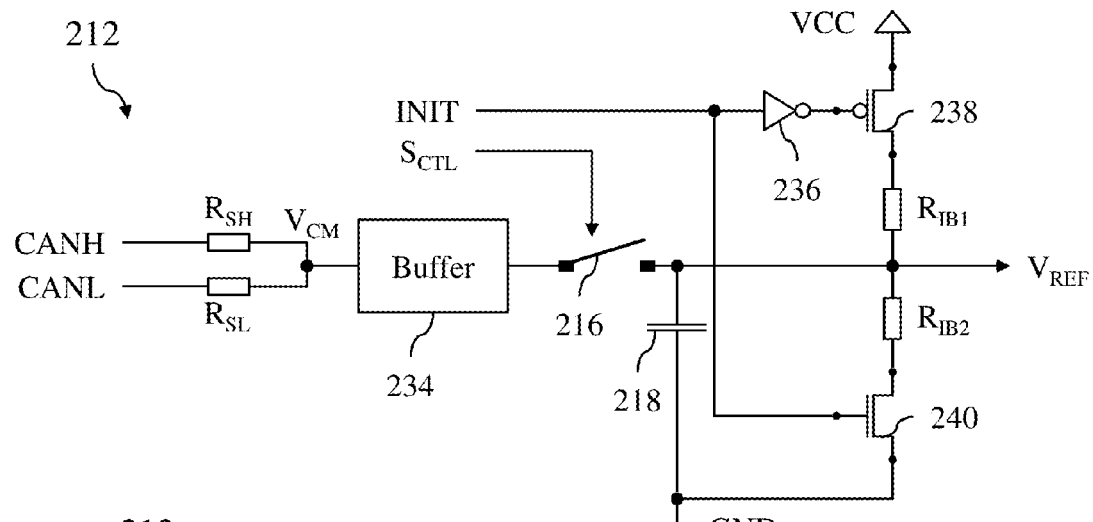
FIG. 14 illustrates a schematic diagram of an embodiment sampling circuit.

FIG. 14 illustrates a schematic diagram of an embodiment sampling circuit 212. In various embodiments, sampling circuit 212 as shown in FIG. 14 is one implementation or portion of various sampling circuit described hereinabove in reference to the other figures. Sampling circuit 212 may include high sampling resistor RSH, low sampling resistor RSL, input buffer 234, sampling switch 216, sampling capacitor 218, and an initial voltage divider circuit including inverter 236, transistor 238, initial bias resistor RIB1, initial bias resistor RIB2, and transistor 240. According to various embodiments, sampling circuit 212 operates in a similar manner as described hereinabove in reference to the other figures. Sampling switch 216 is controlled by switch control SCTL, which may be supplied from an output of a flip flop, an edge detection circuit, or a sample control circuit as described hereinabove in reference to the other figures. In various embodiments, switch control SCTL may be supplied by digital logic or analog circuits.

According to one embodiment, sampling circuit 212 includes the initial voltage divider circuit in order to provide an initial reference bias voltage VREF before any common mode voltage VCM is sampled or measured on sampling capacitor 218. In such embodiments, initialize signal INIT is supplied by a controller, e.g., an application specific integrated circuit (ASIC) or a microcontroller. Initialize signal INIT may be supplied during a startup sequence before common mode voltage VCM on the CAN bus is measured. For example, initialize signal INIT may be generated based on a mode select or mode control signal, such as standby control input STB described hereinabove in reference to FIG. 5. In some embodiments, when a node is enabled, initialize signal INIT may be set to logic high for a set initialization time period. Based on initial signal INIT, transistors 238 and 240 are enabled to provide a conduction path between supply voltage VCC and low reference voltage GND. In some embodiments, transistor 238 is a p-type device and transistor 240 is an n-type device. In other embodiments, transistors 238 and 240, along with the supply and reference voltage configuration may be arranged.

According to a particular embodiment, initial bias resistor RIB1 and initial bias resistor RIB2 are equal and the supplied voltage, equal to supply voltage VCC minus low reference voltage GND, is divided in half for supplying reference bias voltage VREF. That is, initial reference bias voltage VREF may be given by the equation, VREF=(VCC−GND)÷2. In some embodiments, when many CAN nodes are present on a CAN bus, the low reference voltage GND and supply voltage VCC may vary between nodes. In such embodiments, each node may provide a different initial reference bias voltage VREF based on the initial voltage divider circuit. In some embodiments, adjusting reference bias voltage VREF during operation based on common mode voltage VCM measurements may allow multiple nodes to operate with a similar or equal reference bias voltage VREF, which may reduce common mode voltage VCM variations during operation of the CAN bus.

Figure 15:
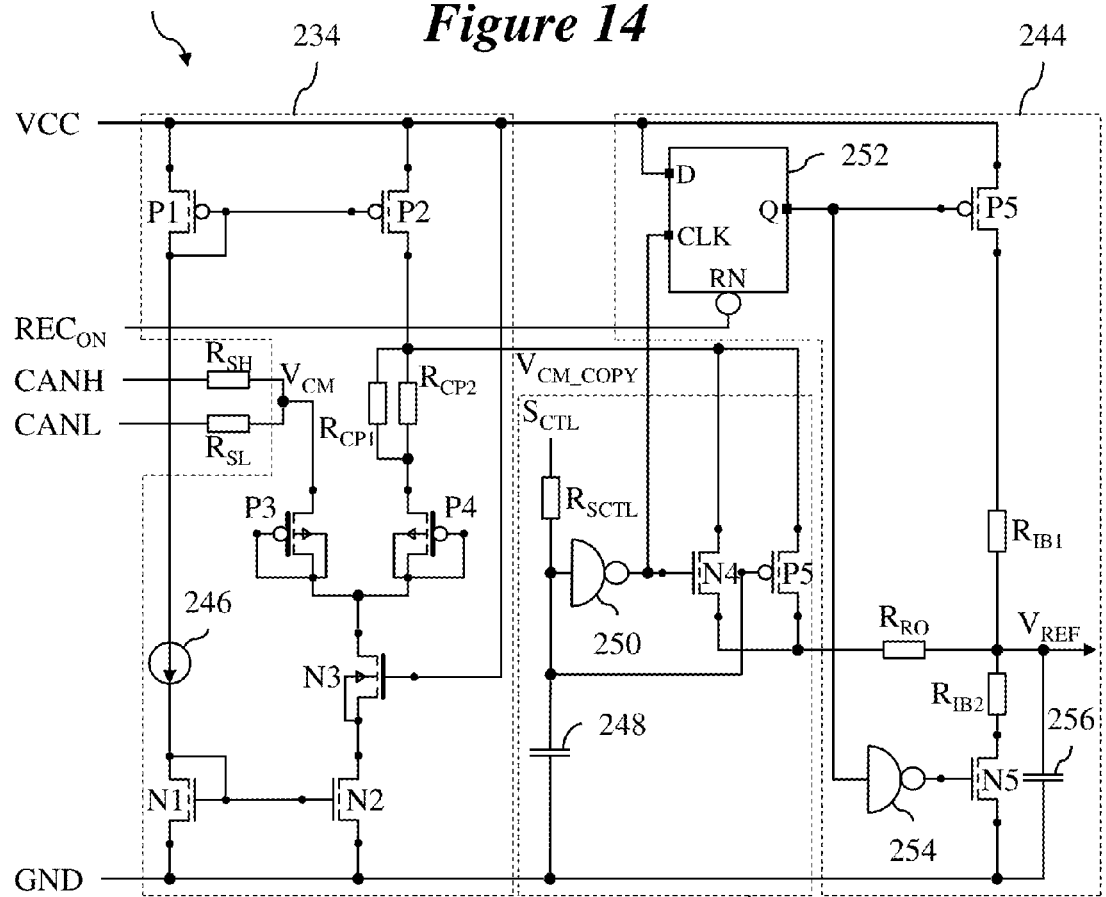
FIG. 15 illustrates a schematic diagram of another embodiment sampling circuit.

FIG. 15 illustrates a schematic diagram of another embodiment sampling circuit 212 according to a specific circuit implementation. Specifically, sampling circuit 212 as shown in FIG. 15 may be one specific implementation of sampling circuit 212 as shown in FIG. 14. According to an embodiment, sampling circuit 212 as shown in FIG. 15 includes high sampling resistor RSH, low sampling resistor RSL, input buffer 234, sampling configuration 242, and initialization stage 244.

In an embodiment, input buffer 234 includes p-type transistors P1, P2, P3, and P4, n-type transistors N1, N2, and N3, copy resistors RCP1 and RCP2, and current source 246. Input buffer 234 receives common mode voltage VCM on the CAN bus from high sampling resistor RSH and low sampling resistor RSL and generates common mode voltage copy VCM_COPY to supply to sampling configuration 242. Switch control SCTL, generated according to various embodiments described hereinabove in reference to the other figures, switch control resistor RSCTL, inverter 250, and capacitor 248 control n-type transistor N4 and p-type transistor P5 to supply common mode voltage copy VCM_COPY to initialization stage 244. In such an embodiment, initialization stage 244 supplies reference bias voltage VREF to a reference circuit (not shown, described hereinabove in reference to the other figures) based on input signals. Initialization stage 244 receives an output of sampling configuration 242 that is based on common mode voltage copy VCM_COPY and also receives receiver enable signal RECON. When receiver enable signal RECON is logic low, flip flop 252 is controlled to drive p-type transistor P5 and, through inverter 254, n-type transistor N5 into a conducting state such that reference bias voltage VREF is output according to the equation VREF=(VCC−GND)÷2, as similarly described hereinabove in reference to FIG. 14. When receiver enable signal RECON is logic high, common mode voltage copy VCM_COPY is supplied through reference output resistor RRO as reference bias voltage VREF. In various embodiments, output capacitor 256 may maintain reference bias voltage VREF.

According to various embodiments, the circuit elements, including resistors, capacitors, transistors, logic gates, flip flop, and current source are illustrative elements that may be rearranged and have various values in different embodiments. The transistors may be implemented as various different types with various doping configurations. The resistor values may take on a range of values. For example, high sampling resistor RSH, low sampling resistor RSL, copy resistors RCP1 and RCP2, switch control resistor RSCTL, reference output resistor RRO, and initial bias resistors RIB1 and RIB2 may be optimized based on various application requirements. Similarly, capacitors 248 and 256 may also be optimized based on various application requirements.

Figure 16:
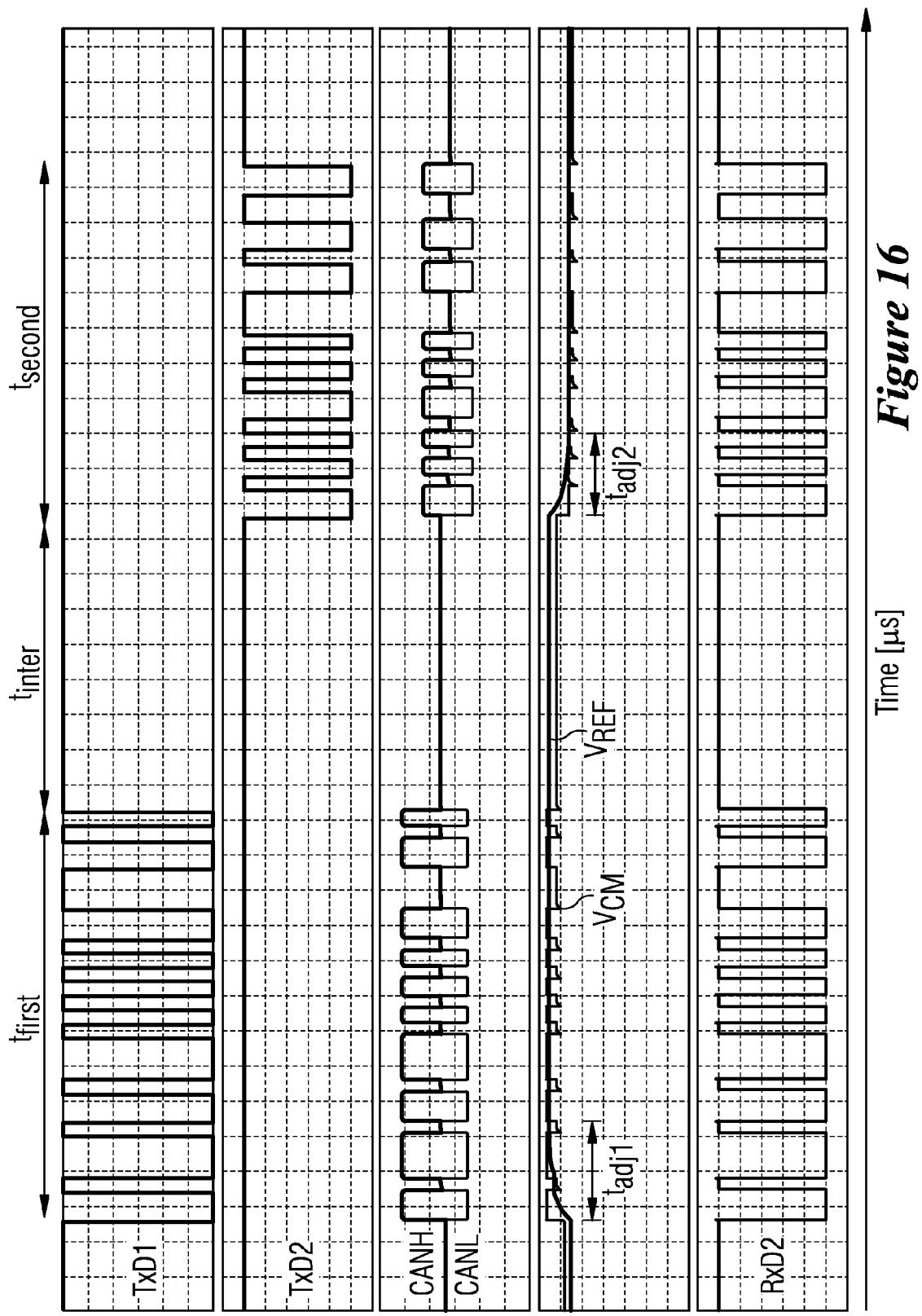
FIG. 16 illustrates a waveform diagram of signals in an embodiment two-wire network.

FIG. 16 illustrates a waveform diagram of signals in an embodiment two-wire network. According to an embodiment, a first transceiver and a second transceiver operate on a CAN bus with high wire CANH and low wire CANL, such as described hereinabove in reference to FIG. 1. FIG. 16 illustrates transmit data signal TxD1 from the first transceiver, transmit data signal TxD2 from the second transceiver, voltage levels on high wire CANH and low wire CANL, common mode voltage VCM, reference bias voltage VREF, and receive data signal RxD2 from the second transceiver. In some embodiments, the first transceiver transmits a first CAN telegram during first time period $t_{first}$. During first time period $t_{first}$, transmit data signal TxD1 is driven onto the CAN bus as shown by the voltage signals on high wire CANH and low wire CANL alternating between dominant and recessive states corresponding to transmit data signal TxD1. Consequently, receive data signal RxD2 from the second transceiver also transitions between logic high and logic low levels corresponding to the signals on the CAN bus driven according to transmit data signal TxD1.

In such embodiments, while transmit data signal TxD1 is being driven onto the CAN bus, common mode voltage VCM may experience some variation, particularly during dominant and recessive transitions on the CAN bus, as shown. As described hereinabove in reference to the other figures, a reference bias circuit may measure common mode voltage VCM during a dominant state and adjust reference bias voltage VREF applied to the CAN bus, as shown during first adjustment time $t_{adj1}$. When the first transceiver begins transmitting transmit data signal TxD1, an initial variation in common mode voltage VCM may be introduced by the first transceiver. By measuring common mode voltage VCM and adjusting reference bias voltage VREF during first adjustment time $t_{adj1}$, variations in common mode voltage VCM during the remainder of the first CAN telegram (first time period $t_{first}$) may be reduced.

In various embodiments, common mode voltage VCM may be measured and reference bias voltage VREF may be adjusted multiple times during a CAN telegram. For example, common mode voltage VCM may be measured during each dominant state and reference bias voltage VREF may be adjusted based on each measurement. In other embodiments, reference bias voltage VREF is only adjusted based on a series of measurements or an average. In some specific embodiments, common mode voltage VCM and reference bias voltage VREF are only measured and adjusted, respectively, during a first portion of a data phase of a CAN telegram.

Following the first CAN telegram during first time period $t_{first}$, intermission time period $t_{inter}$ occurs with no activity on the CAN bus, as shown. In various embodiments, intermission time period $t_{inter}$ may be any duration. During intermission time period $t_{inter}$, reference bias voltage VREF may be maintained at a constant, or substantially constant, value.

Following intermission time period $t_{inter}$, the second transceiver transmits a second CAN telegram during second time period $t_{second}$. During second time period $t_{second}$, transmit data signal TxD2 is driven onto the CAN bus as shown by the voltage signals on high wire CANH and low wire CANL alternating between dominant and recessive states corresponding to transmit data signal TxD2. As shown, the second transceiver may drive the CAN bus with voltage signals at different levels compared to the first transceiver, as shown by the voltage signals on high wire CANH and low wire CANL. In such embodiments, common mode voltage VCM may experience variations of different magnitude or voltage polarity. Thus, when the second transceiver begins transmitting transmit data signal TxD2, a reference bias circuit may measure common mode voltage VCM during a dominant state and adjust reference bias voltage VREF applied to the CAN bus during second adjustment time $t_{adj2}$ in a similar manner as during first adjustment time $t_{adj1}$. For illustrative purposes reference bias voltage VREF is shown to undergo a voltage adjustment during the beginning of each CAN telegram. In some specific embodiments, reference bias circuits adjust reference bias voltage VREF after arbitration phases of each CAN telegram. In a more specific embodiment, reference bias circuits adjust reference bias voltage VREF only during the data phase of a CAN telegram. In alternative embodiments, reference bias circuits adjust reference bias voltage VREF during any phase of a CAN telegram.

According one embodiment, FIG. 16 illustrates the first transceiver and the second transceiver, i.e., two nodes coupled to a CAN bus. In further embodiments, a network communicating through a CAN bus may include any number of nodes. For a given CAN telegram, many or all nodes may transmit during an arbitration phase. After arbitration is completed, only one node continues to transmit during a data phase of the CAN telegram. In various such embodiments, multiple or all receiving nodes may measure common mode voltage VCM and adjust reference bias voltage VREF as described hereinabove. Further, the transmitting node may also measure common mode voltage VCM during dominant states and adjust reference bias voltage VREF based on the measured common mode voltage VCM. In some embodiments, each node coupled to a CAN bus applies a reference bias voltage VREF. By measuring common mode voltage VCM on the CAN bus and adjusting reference bias voltage VREF based on same measured voltage, each node may drive a same or substantially same reference bias voltage VREF onto the CAN bus.

Figure 17:
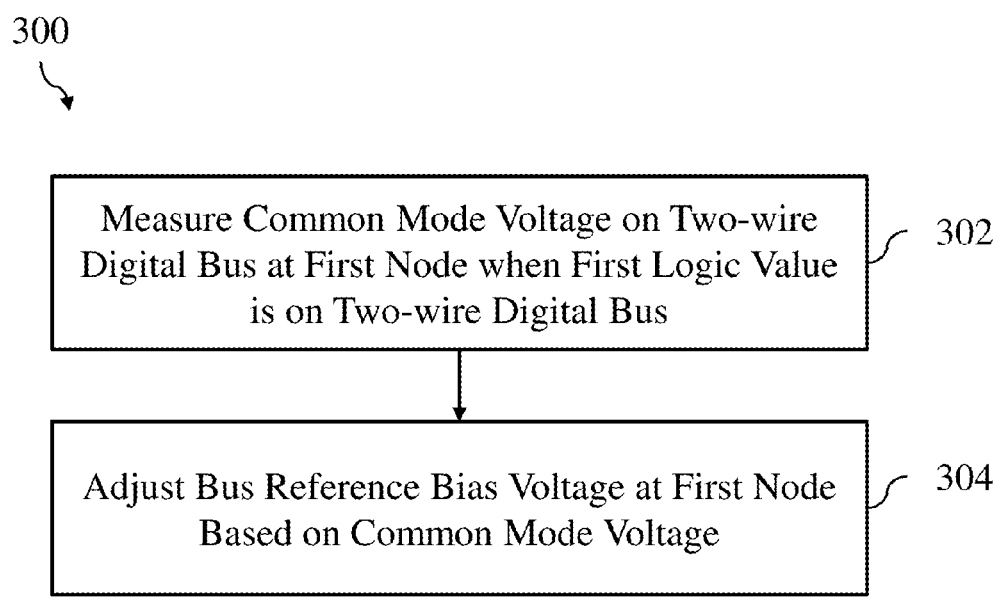
FIG. 17 illustrates a block diagram of an embodiment method of operation.

FIG. 17 illustrates a block diagram of an embodiment method of operation 300 including steps 302 and 304. According to various embodiments, method of operation 300 is a method of operating a two-wire digital bus. In specific embodiments, the two-wire bus is a CAN bus with a high wire CANH and a low wire CANL. Step 302 includes measuring a common mode voltage on the two-wire digital bus at a first node when a first logic value is on the two-wire digital bus. The first logic value may be driven by a second node. For example, the second node may be a transmitting node and the first node may be a receiving node connected through a CAN bus. In various embodiments, step 304 includes adjusting a bus reference bias voltage at the first node based on the common mode voltage. For example, the first node, which is receiving, may measure the common mode voltage when a dominant state is on the CAN bus and adjust the bus reference bias voltage applied by the receiver to the CAN bus. The adjusting is based on the measured common mode voltage on the CAN bus. Various additional steps may be included and the order may be rearranged for method of operation 300 in different embodiments. In one embodiment, the common mode voltage may be received at a reference bias circuit and the method of operation may be simplified to omit measuring in step 302.

According to various embodiments described herein in reference to the figures, measuring and sampling of common mode voltage VCM on a CAN bus is generally shown to include measuring and sampling on a capacitor, such as sampling capacitor 218, for example. It should be appreciated that in alternative embodiments, it is envisioned that other voltage measurement techniques, as are known to those of skill in the art, may be used to measure common mode voltage VCM. For example, an ADC may be used in some embodiments. Thus, specific embodiments described herein include a sampling capacitor, but other additional embodiments using similar methods with alternate voltage measuring configurations are envisioned. Further, the measured common mode voltage VCM may be received at a node coupled to the CAN bus. In some additional embodiments, embodiment CAN nodes configured to adjust reference bias voltage VREF applied to the CAN bus may receive the measured common mode voltage VCM from any source.

According to various embodiments, a method of operating a two-wire digital bus includes applying a bias voltage to the two-wire digital bus at a first interface node, measuring a common mode voltage of the two-wire digital bus at the first interface node, and adjusting the bias voltage at the first interface node based on the measured common mode voltage. Other embodiments of this aspect include corresponding circuit systems or apparatus, each configured to perform the actions of embodiment methods.

In various embodiments, measuring the common mode voltage includes measuring a first voltage on a first wire of the two-wire bus, measuring a second voltage on a second wire of the two-wire bus, and generating an average of the first voltage and the second voltage. Measuring the first voltage, measuring the second voltage, and generating an average of the first voltage and the second voltage may be performed using a resistive divider coupled between the first wire of the two-wire bus and the second wire of the two-wire bus. In some embodiments, the two-wire digital bus is a controller area network (CAN) bus, measuring the common mode voltage of the two-wire digital bus is performed when a dominant phase is on the CAN bus, and the dominant phase is driven by a second interface node.

In various embodiments, the method further including identifying a data transmission field in a first CAN transmission on the CAN bus, where measuring the common mode voltage is performed in the first CAN transmission during only the data transmission field. Measuring the common mode voltage may include sampling the common mode voltage on a capacitor. In some embodiments, sampling the common mode voltage is performed when a first logic value is on the two-wire digital bus, where the first logic value corresponds to a bus voltage difference between the first wire and the second wire that is greater than a first threshold. The method may further include detecting a rising edge corresponding to the first logic value, where sampling the common mode voltage is performed based on detecting the rising edge. The method may still further include generating a sample control signal when the bus voltage difference is greater than a second threshold, the second threshold greater in magnitude than the first threshold, where sampling the common mode voltage is performed based on the sample control signal.

In various embodiments, the method further includes generating an average over time of the common mode voltage based on the sampling. The method may further include generating an average over time of the common mode voltage based on the sampling when the first logic value is on the two-wire digital bus. In some embodiments, applying the bias voltage includes generating the bias voltage at a bias circuit, and coupling the bias voltage from the bias circuit to the two-wire digital bus through a resistive divider. Adjusting the bias voltage may include adjusting the bias voltage to substantially match the measured common mode voltage.

According to various embodiments, an interface node for a two-wire bus includes a measurement circuit coupled to the two-wire bus and a bias circuit coupled to the two-wire bus and the measurement circuit. The measurement circuit is configured to measure a common mode voltage on a high wire and a low wire of the two-wire bus when a first logic value is present on the two-wire bus. The bias circuit is configured to apply a bias voltage to the high wire and the low wire, and adjust the bias voltage based on the common mode voltage. Other embodiments of this aspect include corresponding circuit systems or apparatus each configured to perform the actions of embodiment methods.

In various embodiments, the two-wire bus includes a controller area network (CAN) bus. The CAN bus may further include a receiver circuit having inputs coupled to the high wire and the low wire of the CAN bus, and a protocol handler coupled to an output of the receiver circuit, where the protocol handler is configured to identify data phases of CAN frames and control the measurement circuit to measure the common mode voltage only during data phases. In some embodiments, the first logic value includes a dominant phase on the CAN bus. The measurement circuit may include a resistive divider circuit coupled between the high wire and the low wire.

In various embodiments, the measurement circuit includes a sampling circuit with a sampling input coupled to a middle tap of the resistive divider circuit and a reference output coupled to the bias circuit. In such embodiments, the sampling circuit is configured to sample the common mode voltage of the two-wire bus through the resistive divider circuit based on a sampling control signal, and provide the common mode voltage to the reference output. The sampling circuit may include a sample and hold circuit with a sampling switch coupled to the sampling input and a sampling capacitor coupled to an output of the switch and the reference output. The sampling circuit may include an edge detector coupled to a receiver circuit coupled to the two-wire bus, where the edge detector is configured to generate the sampling control signal. In some embodiments, the interface node further includes a threshold comparator coupled to the two-wire bus, and an edge detector coupled to the threshold comparator, where the edge detector is configured to generate the sampling control signal, and the threshold comparator has a higher threshold than a receiver circuit coupled to the two-wire bus.

In various embodiments, the interface node further includes a delayed reset flip-flop coupled to a receiver circuit coupled to the two-wire bus, where the delayed reset flip-flop is configured to generate the sampling control signal. The interface node may further include a threshold comparator coupled to the two-wire bus and a delayed reset flip-flop coupled to the threshold comparator, where the delayed reset flip-flop is configured to generate the sampling control signal and the threshold comparator has a higher threshold than a receiver circuit coupled to the two-wire bus. In some embodiments, the bias circuit includes an operational amplifier with an input configured to receive the common mode voltage and an output coupled to the two-wire bus through a resistive divider circuit.

According to various embodiments, a method of operating a controller area network (CAN) includes receiving signals of a first frame on a CAN bus at a first node circuit, determining a data phase of the frame, measuring a common mode voltage on the CAN bus during the data phase, adjusting a bias voltage based on the measuring, and applying the bias voltage to the CAN bus at the first node. The signals include recessive values and dominant values. Other embodiments of this aspect include corresponding circuit systems or apparatus, each configured to perform the actions of the methods.

In various embodiments, the common mode voltage is measured only during the data phase when dominant values are on the CAN bus. Measuring the common mode voltage may include performing a plurality of measurements during the data phase and averaging the plurality of measurements. In some embodiments, measuring the common mode voltage includes measuring a first voltage on a high wire of the CAN bus, measuring a second voltage on a low wire of the CAN bus, and generating an average of the first voltage and the second voltage.

According to various embodiments described herein, advantages may include CAN bus operation with reduced EMF emissions. Various embodiments described herein may advantageously include nodes coupled to a CAN bus that adjust a bias voltage applied to the CAN bus at each node when the respective node is in the receiving state. The bias voltage is adjusted based on a common mode voltage on the CAN bus that may be measured by each node. By adjusting the bias voltage based on the common mode voltage on the CAN bus, variations in the common mode voltage during voltage transitions on the CAN bus may be reduced. Because common mode voltage variations may produce EMF emissions, by reducing the common mode voltage variations, embodiments described herein may reduce EMF emissions during operation on a CAN. In further embodiments, EMF emissions may be reduced using similar techniques applied to other types of networks.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a two-wire digital bus, the method comprising:
    applying a bias voltage to the two-wire digital bus at a first interface node;
    measuring a common mode voltage of the two-wire digital bus at the first interface node; and
    adjusting the bias voltage at the first interface node based on the measured common mode voltage, wherein measuring the common mode voltage comprises measuring a first voltage on a first wire of the two-wire digital bus, measuring a second voltage on a second wire of the two-wire digital bus, and generating an average of the first voltage and the second voltage.

2. The method of claim 1, wherein measuring the first voltage, measuring the second voltage, and generating an average of the first voltage and the second voltage is performed using a resistive divider coupled between the first wire of the two-wire digital bus and the second wire of the two-wire digital bus.

3. The method of claim 1, wherein:
the two-wire digital bus comprises a controller area network (CAN) bus;
measuring the common mode voltage of the two-wire digital bus is performed when a dominant phase is on the CAN bus; and
the dominant phase is driven by a second interface node.

4. The method of claim 3, further comprising identifying a data transmission field in a first CAN transmission on the CAN bus, wherein measuring the common mode voltage is performed in the first CAN transmission during only the data transmission field.

5. The method of claim 1, wherein measuring the common mode voltage comprises sampling the common mode voltage on a capacitor.

6. The method of claim 5, wherein sampling the common mode voltage is performed when a first logic value is on the two-wire digital bus, wherein the first logic value corresponds to a bus voltage difference between the first wire and the second wire that is greater than a first threshold.

7. The method of claim 6, further comprising detecting a rising edge corresponding to the first logic value, wherein sampling the common mode voltage is performed based on detecting the rising edge.

8. The method of claim 6, further comprising generating a sample control signal when the bus voltage difference is greater than a second threshold, the second threshold greater in magnitude than the first threshold, wherein sampling the common mode voltage is performed based on the sample control signal.

9. The method of claim 8, further comprising generating an average over time of the common mode voltage based on the sampling.

10. The method of claim 6, further comprising generating an average over time of the common mode voltage based on the sampling when the first logic value is on the two-wire digital bus.

11. A method of operating a two-wire digital bus, the method comprising:
applying a bias voltage to the two-wire digital bus at a first interface node;
measuring a common mode voltage of the two-wire digital bus at the first interface node; and
adjusting the bias voltage at the first interface node based on the measured common mode voltage, wherein applying the bias voltage comprises
generating the bias voltage at a bias circuit, and
coupling the bias voltage from the bias circuit to the two-wire digital bus through a resistive divider.

12. The method of claim 11, wherein adjusting the bias voltage comprises adjusting the bias voltage to substantially match the measured common mode voltage.

13. An interface node for a two-wire bus, the interface node comprising:
a measurement circuit coupled to the two-wire bus and configured to measure a common mode voltage on a high wire and a low wire of the two-wire bus when a first logic value is present on the two-wire bus; and
a bias circuit coupled to the two-wire bus and the measurement circuit, wherein the bias circuit is configured to:
apply a bias voltage to the high wire and the low wire, and
adjust the bias voltage based on the common mode voltage.

14. The interface node of claim 13, wherein the two-wire bus comprises a controller area network (CAN) bus, and further comprising
a receiver circuit having inputs coupled to the high wire and the low wire of the CAN bus, and
a protocol handler coupled to an output of the receiver circuit, wherein the protocol handler is configured to identify data phases of CAN frames and control the measurement circuit to measure the common mode voltage only during data phases.

15. The interface node of claim 14, wherein the first logic value comprises a dominant phase on the CAN bus.

16. The interface node of claim 13, wherein the measurement circuit comprises a resistive divider circuit coupled between the high wire and the low wire.

17. The interface node of claim 16, wherein the measurement circuit comprises
a sampling circuit with a sampling input coupled to a middle tap of the resistive divider circuit and a reference output coupled to the bias circuit, wherein the sampling circuit is configured to
sample the common mode voltage of the two-wire bus through the resistive divider circuit based on a sampling control signal, and
provide the common mode voltage to the reference output.

18. The interface node of claim 17, wherein the sampling circuit comprises a sample and hold circuit with a sampling switch coupled to the sampling input and a sampling capacitor coupled to an output of the sampling switch and the reference output.

19. The interface node of claim 17, wherein the sampling circuit comprises an edge detector coupled to a receiver circuit coupled to the two-wire bus, wherein the edge detector is configured to generate the sampling control signal.

20. The interface node of claim 17, further comprising a threshold comparator coupled to the two-wire bus, and an edge detector coupled to the threshold comparator, wherein the edge detector is configured to generate the sampling control signal, and the threshold comparator has a higher threshold than a receiver circuit coupled to the two-wire bus.

21. The interface node of claim 17, further comprising a delayed reset flip-flop coupled to a receiver circuit coupled to the two-wire bus, wherein the delayed reset flip-flop is configured to generate the sampling control signal.

22. The interface node of claim 17, further comprising a threshold comparator coupled to the two-wire bus and a delayed reset flip-flop coupled to the threshold comparator, wherein the delayed reset flip-flop is configured to generate the sampling control signal and the threshold comparator has a higher threshold than a receiver circuit coupled to the two-wire bus.

23. The interface node of claim 13, wherein the bias circuit comprises an operational amplifier with an input configured to receive the common mode voltage and an output coupled to the two-wire bus through a resistive divider circuit.

24. A method of operating a controller area network (CAN), the method comprising:
- receiving signals of a first frame on a CAN bus at a first node circuit, wherein the signals comprise recessive values and dominant values;
- determining a data phase of the first frame;
- measuring a common mode voltage on the CAN bus during the data phase;
- adjusting a bias voltage based on the measuring; and
- applying the bias voltage to the CAN bus at the first node circuit.

25. The method of claim 24, wherein the common mode voltage is measured only during the data phase when dominant values are on the CAN bus.

26. The method of claim 24, wherein measuring the common mode voltage comprises performing a plurality of measurements during the data phase and averaging the plurality of measurements.

27. The method of claim 24, wherein measuring the common mode voltage comprises measuring a first voltage on a high wire of the CAN bus, measuring a second voltage on a low wire of the CAN bus, and generating an average of the first voltage and the second voltage.

* * * * *